US012721343B2

(12) United States Patent
Ypema et al.

(10) Patent No.: US 12,721,343 B2
(45) **Date of Patent: *Sep. 1, 2026**

(54) METHODS AND USES OF A MIXTURE COMPRISING ALPHA-CYPERMETHRIN AND DINOTEFURAN FOR CONTROLLING INVERTEBRATE PESTS IN T

(71) Applicant: BASF AGRO B.V., Arnhem (NL)

(72) Inventors: Hendrik Leonard Ypema, Cary, NC (US); Katelyn A. Venner, Research Triangle Park, NC (US); Kenneth Scott Brown, Research Triangle Park, NC (US); Jeffery Douglas Vannoy, Research Triangle Park, NC (US); Brian K. Thompson, Research Triangle Park, NC (US); Kyle J. Miller, Research Triangle Park, NC (US); Jennifer Bergh Browning, Research Triangle Park, NC (US); Kathie M. Kalmowitz, Raleigh, NC (US)

(73) Assignee: BASF AGRO B.V., Arnhem (NL)

( * ) Notice: Subject to any disclaimer, the term of this patent is extended or adjusted under 35 U.S.C. 154(b) by 808 days.

This patent is subject to a terminal disclaimer.

(21) Appl. No.: 17/801,831

(22) PCT Filed: Feb. 17, 2021

(86) PCT No.: PCT/EP2021/053844

§ 371 (c)(1),
(2) Date: Aug. 24, 2022

(87) PCT Pub. No.: WO2021/170463

PCT Pub. Date: Sep. 2, 2021

(65) Prior Publication Data

US 2023/0106291 A1 Apr. 6, 2023

Related U.S. Application Data

(60) Provisional application No. 62/983,222, filed on Feb. 28, 2020.

(30) Foreign Application Priority Data

Apr. 3, 2020 (EP) .................................... 20168030

(51) Int. Cl.

| | |
|---|---|
| ***A01N 53/00*** | (2006.01) |
| ***A01N 25/14*** | (2006.01) |
| ***A01N 51/00*** | (2006.01) |
| ***A01P 5/00*** | (2006.01) |
| ***A01P 7/04*** | (2006.01) |

(52) U.S. Cl.
CPC ............. *A01N 53/00* (2013.01); *A01N 25/14* (2013.01); *A01N 51/00* (2013.01); *A01P 5/00* (2021.08); *A01P 7/04* (2021.08)

(58) Field of Classification Search
CPC ..................................................... A01N 53/00
See application file for complete search history.

(56) References Cited

U.S. PATENT DOCUMENTS

| | | | | |
|---|---|---|---|---|
| 8,404,260 | B2 * | 3/2013 | Reid | A01N 43/08 424/405 |
| 9,445,594 | B2 * | 9/2016 | Baum | A01N 47/36 |
| 9,469,617 | B2 * | 10/2016 | Baum | C07D 249/08 |
| 10,624,341 | B2 * | 4/2020 | Bedoukian | A01N 25/14 |

FOREIGN PATENT DOCUMENTS

| | | |
|---|---|---|
| CN | 102415406 A | 4/2012 |
| CN | 104255778 A | 1/2015 |

OTHER PUBLICATIONS

Hui-Qin, Chinese Journal of Hygienic Insecticides & Equipments, Issue 1, Dec. 2016, pp. 19-21 & p. 25.*
Feldman, Understanding 'Evergreening' : Making Minor Modifications of Existing Medications to Extend Protections, Health Affairs Jun. 2022 41:6, 801-804.*
Dwivedi, Evergreening: A deceptive device in patent rights, Technology in Society 32 (2010) 324-330.*
Hui-Qin, Chinese Journal of Hygienic Insecticides & Equipments, Issue 1, Dec. 2016.*
Blake Layton, Insect Control in Commercial Turf, 2023.*
Shahid, Environ. Sci. Technol. 2019, 53, 12586-12593.*
Evstratova, Synergy 6 (2018) 1-8.*
"Evaluation of certain veterinary drug residues in food", WHO Technical Report Series—Geneva, 62nd Report, 2004, 83 pages.
European Search Report for EP Patent Application No. 20168030.3, Issued on Aug. 31, 2020, 3 pages.

(Continued)

*Primary Examiner* — Nizal S Chandrakumar
(74) *Attorney, Agent, or Firm* — MARSHALL, GERSTEIN & BORUN LLP

(57) ABSTRACT

The present invention relates to methods and uses for combating or controlling invertebrate pests in turf, which comprises applying a mixture comprising alpha-cypermethrin and dinotefuran to the turf area, the invertebrate pests or their food supply, habitat or breeding grounds. The most common invertebrate pests in turf are certain worms, e.g. Armyworm, ants, e.g. fire ants, bugs and in particular white grubs, which are larvae of different kinds of insects, mainly of bugs. They usually live in the soil and damage the turf grass plants by feeding on their roots. The turf pests can be efficiently combated or controlled by the methods and uses of the invention.

15 Claims, No Drawings

(56) References Cited

OTHER PUBLICATIONS

Hui-Qin, et al., "Efficacy of the mixture of dinotefuran and alpha-cypermethrin against resistant Musca domestica", Chinese Journal of Hygienic Insecticides & Equipments, Issue 1, Dec. 2016, pp. 19-21 & p. 25.

International Search Report and Written Opinion for PCT Patent Application No. PCT/EP2021/053844, Issued on May 11, 2021.

* cited by examiner

METHODS AND USES OF A MIXTURE COMPRISING ALPHA-CYPERMETHRIN AND DINOTEFURAN FOR CONTROLLING INVERTEBRATE PESTS IN T

CROSS-REFERENCE TO RELATED APPLICATIONS

This is the U.S. national phase of International Application No. PCT/EP2021/053844, filed Feb. 17, 2021, which claims the benefit of U.S. Provisional Patent Application No. 62/983,222, filed Feb. 28, 2020, incorporated herein by reference in its entirety, and European Patent Application No. 20168030.3, filed on Apr. 3, 2020.

Methods and uses of a mixture comprising alpha-cypermethrin and dinotefuran for controlling invertebrate pests in turf The present invention relates to methods and uses of a mixture comprising alpha-cypermethrin and dinotefuran for combating or controlling invertebrate pests in turf.

Turf is a general name for an area covered by grass plants. The plants are usually cut short and cover the soil in a dense manner, to provide both mechanial protection and asthetically pleasing appearance. Turf is known to be important for example in golf courses, football or soccer fields, but also private gardens, where it is called lawn.

There is a number of invertebrate pests occurring in turf, mostly in the soil. For example, white grubs (larvae of many coleopteran insects,) devour the roots of the grass plants, so the grass plants get loose and die, and brown patches may form. The structure and protective effect of the cover formed by the turf is damaged, not to mention the unaesthetical appearance. In some cases, even secondary vertebrate pests are attracted, like rats, raccoons, skunks or opposums.

These may look for the invertebrate pests as food, and damage the turf even further. Several other pests attack turfgrass, either by consuming the plant parts above ground, or the crown and roots of the plants. For instance, chinch bugs, sod webworms, cut worms and fall armyworms feed on the upper parts of the plants, leaving areas bare of grass, whereas annual bluegrass weevil, European cranefly and mole cricket damage the plants by consuming the crowns and the roots of the plants. Due to the high quality standards for turf on golf courses, any damage by any pest is not tolerated.

Therefore, there is a need for efficient chemical pesticides, to ensure proper treatment and prevention of turf infestations by invertebrate pests.

Pyrethroids like alpha-cypermethrin have been successfully used in agricultural applications. The same is true for neonicotinoids like dinotefuran. However, it is unclear, if these compounds or a mixture thereof is suitable for treatments in this specific type of grass plants, i.e. if they are able to combat or control the invertebrate pests prevalent in turf, while not causing harm to the plants or the humans. There are often other types of plants nearby turf (trees, ornamentals), which should be not be damaged by the treatment of the turf.

Due to the high diversity of insect pests, their timing of occurrence throughout the year, and various parts of the turf grass they attack, the industry is always in need of efficient, safe and convenient treatments to eliminate these invertebrate pests and protect the turf.

It has now been surprisingly found that the combination of alpha-cypermethrin and dinotefuran has a synergistic effect on invertebrate pests prevalent in turf, which means that the total amount of pesticide can be reduced while preserving excellent insecticidal activity.

Therefore, the invention relates to a method for combating or controlling invertebrate pests in turf, which comprises applying a pesticidally effective amount of a mixture of alpha-cypermethrin and dinotefuran in a weight ratio of from 500:1 to 1:500 to the turf area, the invertebrate pests or their food supply, habitat or breeding grounds.

Likewise, the invention relates to the use of a mixture comprising alpha-cypermethrin and dinotefuran in a weight ratio of from 500:1 to 1:500, for combating or controlling invertebrate turf pests. The use comprises applying the mixture of the present invention to said turf area and its invertebrate pests including the food supply, habitat or breeding grounds thereof.

Alpha-Cypermethrin (racemate comprising (R)-α-cyano-3-phenoxybenzyl (1S, 3S)-3-(2,2-dichlorovinyl)-2,2-dimethylcyclopropanecarboxy late; (S)-α-cyano-3-phenoxybenzyl (1R, 3R) (2,2-dichlorovinyl)-2,2-dimethylcyclopropanecarboxylate) is a known insecticide from the class of pyrethroids and is commercially available. Pyrethroids are repellent insecticides that induce a toxic effect on the insect's nervous system. Pyrethroids obstruct the normal function of an insect's sodium channels resulting in the loss of function of the nerve cell, shutdown of the insect nervous system and ultimately death.

Dinotefuran ((RS)-1-methyl-2-nitro-3-(tetrahydro-3-furylmethyl) guanidine) is a non-repellent insecticide of the neonicotinoid class used to control pests. Its mode of action involves the disruption of the insect's nervous system by inhibiting nicotinic acetylcholine receptors and has been found useful in controlling pyrethroid resistant pests. Dinotefuran acts through contact and ingestion and results in death shortly after contact. Dinotefuran is a fast-acting agent. However, it is more subject to photo degradation.

Turf

In the context of the present invention, the plants to be treated, are turf grass plants (also called turf plants or grass plants) or seeds thereof. Turf plants are narrow-leaved grass plants or low-growing perennials, which form a uniform, long-lived ground cover that provide protection and/or aesthetic appearance. Healthy turf plants can efficiently protect the soil and prevent erosion. They can tolerate traffic and low mowing heights. They are bred in a huge range of varieties, so as to provide choices to best meet all types of environmental and climatic conditions (temperature, humidity, sun exposure) and use requirements. The best grass plant type is chosen according to the climate conditions and the mechanical and aesthetical needs. For example, there are certain turf grass varieties, which grow well in dry or in cooler areas, or others which are able to resist mechanical abrasion (wear tolerance, like e.g. needed for athletic fields like football or soccer fields). Uniform, green, aesthetically pleasing appearance is usually desired. When present in a garden, the turf area is also sometimes referred to as "lawn". Common grass plants used as turf are Bentgrass (*Agrostis* spp.; colonial or creeping bentgrasses), Bluegrass (*Poa spp.*) including Kentucky Bluegrass (*Poa pratensis*) and Supina bluegrass (*Poa supina*), Ryegrass (*Lolium spp.*), Fine Fescues (*Festuca spp.*) including Tall Fescue (*Festuca arundinacea*), Hybrid Bermudagrass (*Cynodon spp.*) including Common Bermudagrass (*Cynodon dactylon*), Kikuyugrass (*Pennisetum clandestinum*), St. Augustinegrass (*Stenotaphrum secundatum*), Zoysiagrass (*Zoysia japonica*), Dichondra (*Dichondra micrantha*).

The most frequent grass plants used for turf are Kentucky bluegrass; perennial ryegrass; tall fescue; fine fescues; Bentgrass; Bermudagrass; and Zoysiagrass.

In one embodiment, the grass plants of the turf are Kentucky bluegrass; perennial ryegrass; tall fescue; and fine fescues.

In one embodiment, the grass plants of the turf are Bentgrass, Bermudagrass, tall fescue, fine fescue, and Zoysiagrass.

For some uses, mixtures of the abovementioned turf grass plants are used, to meet different kinds of requirements. For example, for general lawns, often, a mixture of Kentucky bluegrass and perennial ryegrass is used.

Turf is usually found in golf courses, athletic fields including football or soccer fields, cemeteries, sod farms, parks, gardens (lawn), and public areas like street sides.

Turf Pests

The term "invertebrate pest" (also referred to as pests) as used herein encompasses animal populations, such as arthropods, gastropods, and nematodes, which may attack plants, thereby causing substantial damage to the plants attacked. Preferred invertebrate pests according to the invention are arthropods, preferably insects and arachnids, in particular insects.

In the context of the present invention, turf pests are understood to be invertebrate pests occurring in turf. These are mainly insects and their larvae, worms and snails.

In the context of the present invention, secondary vertebrate pests, like rats, skunks or opposums, are not considered to be a turf pest which can be combatted directly by the methods and uses of the invention. Said secondary vertebrate pests are attracted by the primary invertebrate turf pests and damage the turf even further. However, of course, combating or controlling the turf pests by the methods and uses of the invention helps to prevent said secondary vertebrate pests to appear and damage the turf.

In one embodiment, the invention relates to methods and uses according to the invention, where turf pests are selected from the following pests:

ants, in particular fire ants;

Armyworm (*Frugiperda spp.*, including Fall Armyworm *Frugiperda spodoptera*),

Cutworm (*Agrotis spp*, including Black Cutworm *Agrotis ipsilon*),

Sod webworm (*Herpetogramma spp., Crambus spp.* including *Herpetogramma phaeopteralis*);

Billbug (*Sphenophorus spp.*);

Chinch bug (*Blissus spp.* including *Blissus insularis*);

Annual bluegrass weevil (*Listronotus maculicolis*)

European cranefly (*Tipula paludosa*);

Mole cricket, e.g. Southern mole cricket, Tawny mole cricket (*Scapteriscus spp.*)

White grubs.

One of the most important turf pests are "white grubs". This is not a single species, but a term designating a bigger group of the slug-like larval stage of many insects. They are white-colored, C-shaped and often have small legs and tiny heads. Most are between 1 and 5 cm long. They root around just below the surface, eating the roots of grass and other plants as they grow. The most commonly encountered white grubs are the larvae of June bugs, European Chafers, Masked Chafers, Billbugs, Oriental Beetles and Japanese Beetles. All of these species start as soft-bodied grubs, and are practically indistinguishable from one another.

In one embodiment, the invention relates to methods and uses according to the invention, where turf pests are white grubs which are larvae of the species selected from Asiatic garden beetle (*Maladera castanea*)

Black turfgrass ataenius (*Ataenius spretulus*)

European chafer (*Amphimallus majale*)

Green June beetle (*Cotinis nitida*)

Japanese beetle (*Popillia japonica*)

May/June beetle (*Phyllophaga spp.*)

Northern masked chafer (*Cyclocephala borealis*)

Oriental beetle (*Anomala orientalis*)

Southern masked chafer (*Cyclocephala lurida*)

The white grubs are located in the soil underneath the turf, and damage the turf grass plants by feeding on their roots. The turf grass plants are then unable to receive enough water and nutrients from the soil, and they dry out and often even die. In the affected area of the turf, a whole part of the turf grass plants may come off, and the turf cover has a hole in it. It is difficult to re-grow new plants in this particular spot, and obtain a uniform cover with the older plants.

In one embodiment, the invention relates to methods and uses according to the invention, where turf pests are fire ants. In this case, the treatment is preferably done as mound treatment.

Due to the frequent use of pyrethroids over many years, it has been observed that some turf pests, such as chinch bugs, have become less sensitive to pyrethroids, i.e. they are less or not susceptible to pyrethroids any longer. Pyrethroids do not harm them to the extent expected or compared to other strains of the same pest. This property may be due to a genetic modification, for example a slight modification in the target ligand in the turf pest, or in the metabolism of the turf pest.

Therefore, in one aspect, the invention relates also to methods and uses for combating or controlling turf pests, where the turf pests are pyrethroid-resistant.

As used herein, the term "mixture(s) of the present invention" or "mixture(s) according to the invention" refers to the mixtures comprising alpha-cypermethrin and dinotefuran.

In one embodiment of the invention, the mixture applied in the methods and uses of the present invention comprises only alpha-cypermethrin and dinotefuran as active ingredients in the composition (binary mixture). However, further actives may be added in the present invention if they do not act negatively on the mixture of alpha-cypermethrin and dinotefuran.

It has also been found that simultaneous, that is joint or separate, application of alpha-cypermethrin and dinotefuran, or successive application of alpha-cypermethrin and dinotefuran allows enhanced control of turf pests, compared to the control rates that are possible with the individual compounds.

The mixtures of the invention may be a physical mixture of alpha-cypermethrin and dinotefuran. In a preferred embodiment of the invention, the invention relates to methods and uses for combating or controlling turf pests, by applying a composition comprising alpha-cypermethrin and dinotefuran. In a further preferred embodiment, the composition to be applied is obtained from a concentrated composition comprising alpha-cypermethrin and dinotefuran.

On the other hand, alpha-cypermethrin and dinotefuran may be present in different compositions to be combined in the methods according to the invention, it not being required for alpha-cypermethrin and dinotefuran to be present together in the same formulation.

An example of a composition according to the invention or to be used according to the invention in which alpha-cypermethrin and dinotefuran are not present together in the same formulation is a co-pack. In a co-pack, two or more components are packaged separately, i.e., not jointly pre-formulated. As such, co-packs include one or more separate containers such as vials, cans, bottles, pouches, bags or canisters, each container containing a separate component for a composition. One example is a two-component co-pack. Accordingly, the invention also relates to a two-component co-pack, comprising a first component which in turn comprises alpha-cypermethrin, a liquid or solid carrier and, if appropriate, at least one surfactant and/or at least one customary auxiliary, and a second component which in turn comprises dinotefuran, a liquid or solid carrier and, if appropriate, at least one surfactant and/or at least one customary auxiliary. More details, e.g. as to suitable liquid and solid carriers, surfactants and customary auxiliaries are described below.

In one embodiment, the composition to be applied is a diluted composition obtained from two different concentrated compositions, one for each active ingredient, which are combined during or after diluting, i.e. while preparing the composition to be applied. This is often referred to as "tank mix".

The "combined" use of alpha-cypermethrin "in combination with" dinotefuran on the one hand can be understood as using a physical mixture of alpha-cypermethrin and dinotefuran. On the other hand, the combined use may also consist in using alpha-cypermethrin and dinotefuran separately, but within a sufficiently short time of one another so that the desired effect can take place. More detailed illustrations of the combined use can be found in the specifications below.

Alpha-cypermethrin and dinotefuran are usually applied in a weight ratio of 1000:1 to 1:1000, preferably from 500:1 to 1:500, preferably from 100:1 to 1:100, in particular from 20:1 to 1:20 or 10:1 to 1:10.

Alpha-cypermethrin and dinotefuran may also be applied in a weight ratio of 500:1 to 1:10, or 100:1 to 1:10, or 50:1 to 1:10, or 20:1 to 1:10, or 10:1 to 1:500, or 10:1 to 1:100, or 10:1 to 50:1, or 10:1 to 1:20. They may also be applied in a weight ratio of 1:1 to 1:5, preferably 1:2, 1:3, 1:4 or 1:5.

In one embodiment of the invention, the weight ratio is around 1:4. In one embodiment of the invention, the weight ratio is around 1:2. The term "around" is to be understood to allow for some tolerance above and below the exact weight ratio. This tolerance might be up to 50%, so e.g. 0.5:4 or 1:6 would be still covered by the term "around 1:4".

Formulations

In the methods and uses of the invention, alpha-cypermethrin and dinotefuran are provided as compositions comprising an auxiliary and the mixture of the present invention.

A composition comprises a pesticidally effective amount of the mixture of the present invention.

The term "pesticidally effective amount" is defined below.

The mixtures of the present invention can be converted into customary types of compositions, e.g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN, LLINs), as well as gel formulations, or compositions for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, as for similar agrochemical compositions, such as described by Mollet and Grube-mann, Formulation technology, Wiley V C H, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers, and binders.

Suitable solvents and liquid carriers are water and organic solvents, such as mineral oil fractions of medium to high boiling point e.g. kerosene, diesel oil; oils of vegetable or animal origin; aliphatic, cyclic and aromatic hydrocarbons e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the mixtures of the present invention on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-soluble concentrates (SL, LS)

10-60 wt. % of a compound I or II or a mixture according to the invention and 5-15 wt. % wetting agent (e.g. alcohol alkoxylates) are dissolved in water and/or in a water-soluble solvent (e.g. alcohols) up to 100 wt. %. The active substance dissolves upon dilution with water.

ii) Dispersible concentrates (DC)

5-25 wt. % of a compound I or II or a mixture according to the invention and 1-10 wt. % dispersant (e. g. polyvinylpyrrolidone) are dissolved in up to 100 wt. % organic solvent (e.g. cyclohexanone). Dilution with water gives a dispersion.

iii) Emulsifiable concentrates (EC)

15-70 wt. % of a compound I or II or a mixture according to the invention and 5-10 wt. % emulsifiers (e.g. calcium dodecylbenzenesulfonate and castor oil ethoxylate) are dissolved in up to 100 wt. % water-insoluble organic solvent (e.g. aromatic hydrocarbon). Dilution with water gives an emulsion.

iv) Emulsions (EW, EO, ES)

5-40 wt. % of a compound I or II or a mixture according to the invention and 1-10 wt. % emulsifiers (e.g. calcium dodecylbenzenesulfonate and castor oil ethoxylate) are dissolved in 20-40 wt. % water-insoluble organic solvent (e.g. aromatic hydrocarbon). This mixture is introduced into up to 100 wt. % water by means of an emulsifying machine and made into a homogeneous emulsion. Dilution with water gives an emulsion.

v) Suspensions (SC, OD, FS)

In an agitated ball mill, 20-60 wt. % of a compound I, preferably compound a) of formula (I), or II or a mixture according to the invention are comminuted with addition of 2-10 wt. % dispersants and wetting agents (e.g. sodium lignosulfonate and alcohol ethoxylate), 0,1-2 wt. % thickener (e.g. xanthan gum) and up to 100 wt. % water to give a fine active substance suspension. Dilution with water gives a stable suspension of the active substance. For FS type composition up to 40 wt. % binder (e.g. polyvinylalcohol) is added.

vi) Water-dispersible granules and water-soluble granules (WG, SG)

50-80 wt. % of a compound I, preferably compound a) of formula (I), or II or a mixture according to the invention are ground finely with addition of up to 100 wt. % dispersants and wetting agents (e.g. sodium lignosulfonate and alcohol ethoxylate) and prepared as water-dispersible or water-soluble granules by means of technical appliances (e.g. extrusion, spray tower, fluidized bed). Dilution with water gives a stable dispersion or solution of the active substance.

vii) Water-dispersible powders and water-soluble powders (WP, SP, WS)

50-80 wt. % of a compound I, preferably compound a) of formula (I), or II or a mixture according to the invention are ground in a rotor-stator mill with addition of 1-5 wt. % dispersants (e.g. sodium lignosulfonate), 1-3 wt. % wetting agents (e.g. alcohol ethoxylate) and up to 100 wt. % solid carrier, e.g. silica gel. Dilution with water gives a stable dispersion or solution of the active substance.

viii) Gel (GW, GF)

In an agitated ball mill, 5-25 wt. % of a compound I, preferably compound a) of formula (I), or II or a mixture according to the invention are comminuted with addition of 3-10 wt. % dispersants (e.g. sodium lignosulfonate), 1-5 wt. % thickener (e.g. carboxymethylcellulose) and up to 100 wt. % water to give a fine suspension of the active substance. Dilution with water gives a stable suspension of the active substance.

ix) Microemulsion (ME)

5-20 wt. % of a compound I, preferably compound a) of formula (I), or II or a mixture according to the invention are added to 5-30 wt. % organic solvent blend (e.g. fatty acid dimethylamide and cyclohexanone), 10-25 wt. % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt. % of a compound I, preferably compound a) of formula (I), or II or a mixture according to the invention, 0-40 wt. % water insoluble organic solvent (e.g. aromatic hydrocarbon), 2-15 wt. % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt. % of a compound I, preferably compound a) of formula (I), or II according to the invention, 0-40 wt. % water insoluble organic solvent (e.g. aromatic hydrocarbon), and an isocyanate monomer (e.g. diphenylme-thene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt. %. The wt. % relate to the total CS composition.

xi) Dustable powders (DP, DS)

1-10 wt. % of a compound I, preferably compound a) of formula (I), or II or a mixture according to the invention are ground finely and mixed intimately with up to 100 wt. % solid carrier, e.g. finely divided kaolin.

xii) Granules (GR, FG)

0.5-30 wt. % of a compound I, preferably compound a) of formula (I), or II or a mixture according to the invention is ground finely and associated with up to 100 wt. % solid carrier (e.g. silicate). Granulation is achieved by extrusion, spray-drying or the fluidized bed.

xiii) Ultra-low volume liquids (UL)

1-50 wt. % of a compound I, preferably compound a) of formula (I), or II or a mixture according to the invention are dissolved in up to 100 wt. % organic solvent, e.g. aromatic hydrocarbon. The compositions types i) to xi) may optionally comprise further auxiliaries, such as 0.1-1 wt. % bactericides, 5-15 wt. % anti-freezing agents, 0.1-1 wt. % anti-foaming agents, and 0.1-1 wt. % colorants.

In a preferred embodiment, the composition is a formulation type that can be easily diluted. The formulation is diluted in water and then sprayed on the turf. Alternatively, the formulation is diluted in water that is used for watering the turf, i.e. the aqueous solution containing the mixture of the invention is poured evenly on the turf. Therefore, in a preferred embodiment, the formulation type is selected from SC, EC and WG. In a preferred embodiment, the formulation type is WG (wettable granule).

In another preferred embodiment, the composition is a formulation type that allows direct application to the turf. Therefore, in a preferred embodiment, the formulation type is a ready-to-apply granule.

The (concentrated) compositions generally comprise between 0.01 and 95%, preferably between 0.1 and 90%, preferably between 0.5 and 75%, and most preferably between 10 to 40%, or 25 to 40% or 30 to 40% by weight of active substances. Weight % is abbreviated herein as "wt. %". The active substances are employed in a purity of from 90% to 100%, preferably from 95% to 100% (according to NMR spectrum).

Various types of oils, wetters, adjuvants, and other actives (e.g. further insecticides) may be added to the active substances or the compositions comprising them as premix or, if appropriate, not until immediately prior to use (tank mix). These agents can be admixed with the compositions according to the invention in a weight ratio of 1:100 to 100:1, preferably 1:10 to 10:1.

The user applies the composition according to the invention usually from a predosage device. Usually, the composition is made up with water, buffer, and/or further auxiliaries to the desired application concentration and the ready-to-use spray liquor or the agrochemical composition according to the invention is thus obtained.

Usually, an amount of 1 to 10 g, preferably 2 to 5 g, of mixture of active compounds will treat a surface of 1000 square feet. This amount of 1 to 10 g, preferably 2 to 5 g, of mixture of active compounds will need about one-gallon water (3785,41 ml) to achieve the diluted spray mixture. According to one embodiment, individual components of the composition according to the invention such as parts of a kit or parts of a mixture may be mixed by the user himself in a spray tank and further auxiliaries may be added, if appropriate.

In a further embodiment, either individual components of the composition according to the invention or partially premixed components, e.g. components comprising mixtures of the present invention, may be mixed by the user in a spray tank and further auxiliaries and additives may be added, if appropriate.

In a further embodiment, either individual components of the composition according to the invention or partially premixed components, e. g. components comprising mixtures of the present invention, can be applied jointly (e.g. after tank mix) or consecutively.

Application Methods

The mixture of the present invention is suitable for use in protecting grass plants and their plant propagation materials such as seeds, or soil, in which the plants are growing, from attack or infestation by turf pests. Therefore, the present invention also relates to a plant protection method, which comprises contacting grass plants, their plant propagation materials, such as seeds, or soil, in which the grass plants are growing, to be protected from attack or infestation by turf pests, with a pesticidally effective amount of a mixture of the present invention.

The mixture of the present invention can be applied as such or in form of compositions comprising it as defined above. Furthermore, the mixture of the present invention can be applied together with a further mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the grass plants, their plant propagation material such as seeds, soil, or the area, material or environment by the pests.

Suitable application methods include inter alia soil treatment, seed treatment, and foliar application. Soil treatment methods include drenching the soil, drip irrigation (drip application onto the soil), or soil injection. Seed treatment techniques include seed dressing, seed coating, seed dusting, seed soaking, and seed pelleting. Foliar application refers to the application of the pesticidally active mixture to plant foliage, e.g. through spray equipment.

The mixtures of the present invention are suitable for use in combating or controlling invertebrate pests, in particular turf pests. Therefore, the present invention also relates to a method of combating or controlling invertebrate pests in turf, which comprises contacting the invertebrate pests, the turf area, their habitat and the food supply or breeding grounds thereof, or the grass plants and their propagation materials, such as seeds, with a pesticidally effective amount of a mixture of the present invention.

The mixture of the present invention is effective through both contact and ingestion. Furthermore, the mixture of the present invention can be applied to any and all developmental stages, such as egg, larva, pupa, and adult.

For example, in one embodiment, the turf pests are white grubs, which are larvae of insects, e.g. larvae of beetles.

As used herein, the term "contacting" includes both direct contact (applying the mixtures/compositions directly on the invertebrate pest or plant - typically to the foliage, stem or roots of the plant) and indirect contact (applying the mixtures/compositions to the locus, i.e. habitat, breeding ground, plant, seed, soil, area, material or environment in which a pest is growing or may grow, of the invertebrate pest or plant).

The term "plant propagation material" refers to all the generative parts of the turf grass plant such as seeds Seedlings and young plants, which are to be transplanted after germination or after emergence from soil, may also be included. These plant propagation materials may be treated prophylactically with a plant protection compound or mixture either at or before planting or transplanting.

The term "seed" embraces seeds and plant propagules of all kinds including but not limited to true seeds.

In the case of turf grass plants, the planting is done either by sowing or by implanting pre-grown mats of turf with soil (sods). Sowing is done by distributing the turf grass plant seeds evenly on the soil. Sometimes it may be required to press them to the soil, to enhance germination. Provided watering and other conditions are fine enough, the seeds will start germinating, i.e. they will form roots into the soil, and leaves into the air. Over time, the turf grass plants will grow bigger. Regular cutting (mowing) is required, which enhances the branching of the plants and growth of the plants. Mowing is repeated, so a certain short length of the turf grass plants is obtained. A denser cover of the turf is formed over time.

In one embodiment, the seeds of the turf grass plants are treated with a mixture of the invention to combat the invertebrate pests in turf.

In another embodiment, the soil is treated with a mixture of the invention, before or during sowing the turf grass plants.

In another embodiment, the leaves of the young turf grass plants are treated. In another embodiment, the mixtures of the invention are applied to the plants and the soil, e.g. by watering the turf with an aqueous diluted composition comprising a mixture of the invention, so the excess water runs off the plants and penetrates into the soil, or by rain washing the mixture of the invention into the soil after application onto the soil or turf cover.

With the abovementioned sowing process, a lot of time and care is required to obtain a dense aesthetically pleasing and mechanically resistant turf. Often, a dense cover of turf is required quicker and without the care and risks associated with the lengthy sowing and growing process. Therefore, a technique was developed, to pre-grow mats of turf with a layer of soil (sods), and to implant them to the desired place. This is the business of a sod farm: After pre-growing the turf grass plants as described above, a layer of the soil is cut, which has the roots of the turf grass plants in it, and the leaves of the turf grass plants on top of it. This layer is sold to customers. Very often, strips of a certain width and length are cut and rolled, and while being kept humid, they are transported to their new location. They are unrolled on the soil and maybe pressed to the soil. Over time, the roots of the turf grass plants will grow into the soil under the original mat and will form a connection between the implanted mat and the original soil. In one embodiment, the invention relates to methods and uses for combating or controlling turf pests in the sods. In another embodiment, the invention relates to methods and uses for combating turf pests in the soil during and after implanting the sods (mats of turf).

Usually, a turf area is not changed very often, but the turf grass plants are intended to grow there over many years, in a continuous quality. Sometimes, further seeds may be added, to fill gaps in the turf cover. Much care and time is put into maintenance of the turf, i.e. regular mowing, watering, adding fertilizer to the soil, removing unwanted other plant species, and combating or controlling invertebrate pests which may start populating the soil under the turf and damage the roots of the turf grass plants.

In a preferred embodiment, the invention relates to methods and uses for combating or controlling turf pests during maintenance of the turf.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary, e.g. depending on the turf pest to be combatted or controlled A pesticidally effective amount of the compositions will also vary according to the prevailing conditions such as desired pesticidal effect and duration, weather, target species, locus, mode of application, and the like.

In the case of soil treatment or of application to the pests dwelling place or nest, the quantity of active ingredient ranges from 0.0001 to 500 g per 100 $m^2$, preferably from 0.001 to 20 g per 100 $m^2$, preferably from 1 to 10 g per 100 $m^2$, preferably from 2 to 6 g per 100 $m^2$.

For use in treating the grass plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 100 g to 600 g per hectare, more desirably from 200 to 500 g per hectare, e.g., 200 to 300 g per hectare, 300 to 400 g per hectare, 400 to 500 g per hectare, or 500 to 600 g per hectare.

The mixture of the present invention is also suitable for use in the treatment of seeds of the mentioned turf grass plants, in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a mixture of the present invention. The protection of the seedling's roots and shoots is preferred. More preferred is the protection of seedling's shoots from chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active mixture is carried out by spraying or by dusting the seeds before sowing of the plants and before emergence of the plants.

The present invention also comprises seeds coated with or containing the mixture(s) of the present invention. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the mixture of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the mixtures of the invention are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising a mixture of the present invention, or an agriculturally useful salt thereof, as defined herein. The amount of the mixture of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The mixtures of the present invention may also be used for improving the health of a plant. Therefore, the present invention also relates to a method for improving plant health by treating a plant, plant propagation material and/or the locus where the plant is growing or is to grow with an effective and non-phytotoxic amount of a mixture of the present invention.

As used herein "an effective and non-phytotoxic amount" means that the mixture is used in a quantity which allows to obtain the desired effect but which does not give rise to any phytotoxic symptom on the treated turf grass plant or on the plant grown from the treated propagule or treated soil.

The terms "turf grass plant" and "plant propagation material" are defined above. "Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect"), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

Further Mixture Partners

The invention also relates to methods and uses for combating or controlling turf pests with a mixture of alpha-cypermethrin and dinotefuran, wherein said mixture comprises at least one further mixing partner. The further mixing partners can be selected from pesticides, in particular insecticides, nematicides, and acaricides, fungicides, herbicides, plant growth regulators, fertilizers. Preferred mixing partners are insecticides, nematicides, and fungicides.

The following list M of pesticides, grouped according the Mode of Action Classification of the Insecticide Resistance Action Committee (IRAC), together with which the mixtures of the invention can be used and with which potential synergistic effects might be produced, illustrates the possible combinations:

M.1 AChE inhibitors: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb, triazamate; acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion;

M.2. GABA-gated chloride channel antagonists: cyclodiene organochlorine compounds: endosulfan, chlordane; phenylpyrazoles: ethiprole, fipronil, flufiprole, pyrafluprole, pyriprole;

M.3 Sodium channel modulators: pyrethroids: acrinathrin, allethrin, d-cis-trans allethrin, d-trans allethrin, bifenthrin, kappa-bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin,metofluthrin, momfluorothrin, epsilonmomfluorothrin, permethrin, phenothrin, prallethrin, profluthrin, pyrethrin (pyrethrum), resmethrin, silafluofen, tefluthrin, kappa-tefluthrin, tetramethylfluthrin, tetramethrin, tralomethrin, transfluthrin; sodium channel modulators e.g.: DDT, methoxychlor;

M.4 nAChR agonists: neonicotinoids: acetamiprid, clothianidin, cycloxaprid, dinotefuran, imidacloprid, nitenpyram, thiacloprid, thiamethoxam; 4,5-Dihydro-N-nitro-1-(2-oxiranylmethyl)-1H-imidazol-2-amine, (2E-)-1-[(6-Chloropyridin-3-yl)methyl]-N'-nitro-2-pentylidenehydrazinecarboximidamide; 1-[(6-Chloropyridin-3-yl)methyl]-7-methyl-8-nitro-5-propoxy-1,2,3,5,6,7-hexahydroimidazo[1,2-a]pyridine; nicotine; sulfoxaflor; flupyradifurone; triflumezopyrim, (3R)-3-(2-chlorothiazol-5-yl)-8-methyl-5-oxo-6-phenyl-2,3-dihydrothiazolo[3,2-a]pyrimidin-8-ium-7-olate, (3S)-3-(6-chloro-3-pyridyl)-8-methyl-5-oxo-6-phenyl-2,3-dihydrothiazolo[3,2-a]pyrimidin-8-ium-7-olate, (3S)-8-methyl-5-oxo-6-phenyl-3-pyrimidin-5-yl-2,3-dihydrothiazolo[3,2-a]pyrimidin-8-ium-7-olate, (3R)-3-(2-chlorothiazol-5-yl)-8-methyl-5-oxo-6-[3-(trifluoromethyl)phenyl]-2,3-dihydrothiazolo[3,2-a]pyrimidin-8-ium-7-olate; (3R)-3-(2-chlorothiazol-5-yl)-6-(3,5-dichlorophenyl)-8-methyl-5-oxo-2,3-dihydrothiazolo[3,2-a]pyrimidin-8-ium-7-olate, (3R)-3-(2-chlorothiazol-5-yl)-8-ethyl-5-oxo-6-phenyl-2,3-dihydrothiazolo[3,2-a]pyrimidin-8-ium-7-olate;

M.5 Nicotinic acetylcholine receptor allosteric activators: spinosad, spinetoram;

M.6 Chloride channel activators: abamectin, emamectin benzoate, ivermectin, lepimectin, milbemectin;

M.7 Juvenile hormone mimics e.g.: hydroprene, kinoprene, methoprene; fenoxycarb, pyriproxyfen;

M.8 miscellaneous multi-site inhibitors: $CH_3Br$, other alkyl halides, chloropicrin, sulfuryl fluoride, borax, tartar emetic;

M.9 Chordotonal organ TRPV channel modulators: pymetrozine; pyrifluquinazon;

M.10 Mite growth inhibitors: clofentezine, hexythiazox, diflovidazin, etoxazole;

M.11 Microbial disruptors of insect midgut membranes: *bacillus thuringiensis, bacillus sphaericus*, and insecticdal proteins they produce e.g.: *bacillus thuringiensis* subsp. *israelensis, bacillus sphaericus, bacillus thuringiensis* subsp. *aizawai, bacillus thuringiensis subsp. kurstaki, bacillus thuringiensis* subsp. *tenebrionis*, Bt crop proteins: Cry1Ab, Cry1Ac, Cry1Fa, Cry2Ab, mCry3A, Cry3Ab, Cry3Bb, Cry34/35Ab1;

M.12 Inhibitors of mitochondrial ATP synthase: diafenthiuron, organotin miticides e.g.: azocyclotin, cyhexatin, fenbutatin oxide, propargite, tetradifon;

M.13 Uncouplers of oxidative phosphorylation via disruption of the proton gradient: chlorfenapyr, DNOC, sulfluramid;

M.14 nAChR channel blockers: nereistoxin analogues bensultap, cartap hydrochloride, thiocyclam, thiosultap-sodium;

M.15 Inhibitors of the chitin biosynthesis type 0 e.g.: bistrifluron, chlorfluazuron, diflubenzuron, flucycloxuron, flufenoxuron, hexaflumuron, lufenuron, novaluron, noviflumuron, teflubenzuron, triflumuron;

M.16 Inhibitors of the chitin biosynthesis type 1: buprofezin;

M.17 Moulting disruptors: Dipteran, cyromazine;

M.18 Ecdyson receptor agonists e.g.: methoxyfenozide, tebufenozide, halofenozide, fufenozide, chromafenozide;

M.19 Octopamin receptor agonists: amitraz;

M.20 Mitochondrial complex III electron transport inhibitors: hydramethylnon, acequinocyl, fluacrypyrim; bifenazate;

M.21 METI acaricides and insecticides e.g.: fenazaquin, fenpyroximate, pyrimidifen, pyridaben, tebufenpyrad, tolfenpyrad, rotenone;

M.22 Voltage-dependent sodium channel blockers: indoxacarb, metaflumizone, 2-[2-(4-cyanophenyl)-1-[3-(trifluoromethyl)phenyl]ethylidene]-N-[4-(difluoromethoxy)phenyl]-hydrazinecarboxamide, N-(3-chloro-2-methylphenyl)-2-[(4-chlorophenyl)[4-[methyl(methylsulfonyl)amino]phenyl]methylene]-hydrazinecarboxamide;

M.23 Inhibitors of the of acetyl CoA carboxylase e.g.: spirodiclofen, spiromesifen, spirotetramat; spiropidion;

M.24 Mitochondrial complex IV electron transport inhibitors: e.g. aluminium phosphide, calcium phosphide, zinc phosphide, cyanide;

M.25 Mitochondrial complex II electron transport inhibitors e.g.: cyenopyrafen, cyflumetofen;

M.28 Ryanodine receptor-modulators: flubendiamide, chlorantraniliprole, cyantraniliprole, tetra-niliprole, (R)-3-chloro-N1-{2-methyl-4-[1,2,2,2-tetrafluoro-1-(trifluoromethyl)ethyl]phenyl}-N2-(1-methyl-2-methylsulfonylethyl)phthalamid, (S)-3-chloro-N1-{2-methyl-4-[1,2,2,2-tetrafluoro-1-(trifluoromethypethyl]phenyl}-N2-(1-methyl-2-methylsulfonylethyl)phthalamide, cyclaniliprole, methyl-2-[3,5-dibromo-2-({[3-bromo-1-(3-chlorpyridin-2-yl)-1H-pyrazol-5-yl]carbonyl}-amino)benzoyl]-1,2-dimethylhydrazinecarboxylate; N-[2-(5-amino-1,3,4-thiadiazol-2-yl)-4-chloro-6-methylphenyl]-3-bromo-1-(3-chloro-2-pyridinyl)-1H-pyrazole-5-carboxamide; 3-chloro-1-(3-chloro-2-pyridinyl)-N-[2,4-dichloro-6-[[(1-cyano-1-methylethyl)amino]carbonyl]phenyl]-1H-pyrazole-5-carboxamide; tetrachlorantraniliprole; N-[4-chloro-2-[[(1,1-dimethylethyl)amino]carbonyl]-6-methylphenyl]-1-(3-chloro-2-pyridinyl)-3-(fluoromethoxy)-1H- pyrazole-5-carboxamide; cyhalodiamide;

M.29: Chordotonal organ Modulators: flonicamid;

M.UN. Unknown mode of action: afidopyropen, afoxolaner, azadirachtin, amidoflumet, benzoximate, broflanilide, bromopropylate, chinomethionat, cryolite, dicloromezotiaz, dicofol, dimpropyridaz, flufenerim, flometoquin, fluensulfone, fluhexafon, fluopyram, fluralaner, metaldehyde, metoxadiazone, piperonyl butoxide, pyflubumide, pyridalyl, tioxazafen, 11-(4-chloro-2,6-dimethylphenyl)-12-hydroxy-1,4-dioxa-9-azadispiro[4.2.4.2]-tetradec-11-en-10-one, 3-(4'-fluoro-2,4-dimethylbiphenyl-3-yl)-4-hydroxy-8-oxa-1-azaspiro[4.5]dec-3-en-2-one, 1-[2-fluoro-4-methyl-5-[(2,2,2-trifluoroethyl)sulfinyl]phenyl]-3-(trifluoromethyl)-1H-1,2,4-triazole amine, actives on basis of *bacillus firmus* (Votivo, I-1582); flupyrimin; fluazaindolizine; 4-[5-(3,5-dichlorophenyl)-5-(trifluoromethyl)-4H-isoxazol-3-yl]-2-methyl-N-(1-oxothietan-3-yl)benzamide; fluxametamide; 5-[3-[2,6-dichloro-4-(3,3-dichloroallyloxy)phenoxy]propoxy]-1H-pyrazole; 4-cyano-N-[2-cyano-5-[[2,6-dibromo-4-[1,2,2,3,3,3- hexafluoro-1-(trifluoromethyl)-propyl]phenyl]carbamoyl]phenyl]-2-methyl-benzamide; 4-cyano-3-[(4-cyano-2-methyl-benzoyl)amino]-N-[2,6-dichloro-4-[1,2,2,3,3,3-hexafluoro-1-(trifluoromethyl)ppropyl]phenyl]-2-fluoro-benzamide; N-[5[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide; N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide; N-[5-[[2-bromo-6-chloro-4-[1,2,2,3,3,3-hexafluoro-1-(trifluoromethyl)propyl]phenyl]carbamoyl]-2-cyanophenyl]-4-cyano-2-methyl-benzamide; 4-cyano-N-[2-cyano-5-[[2,6-dichloro-4-[1,2,2,3,3,3-hexafluoro-1-(trifluoromethyl)-propyl]phenyl]carbamoyl]phenyl]-2-methyl-benzamide; 4-cyano-N-[2-cyano-5-[[2,6-dichloro-4-[1,2,2,2-tetrafluoro-1-(trifluoromethypethyl]phenyl] carbamoyl]phenyl]-2-methyl-benzamide; N-[5-[[2-bromo-6-chloro-4-[1,2,2,2-tetrafluoro-1-(trifluoromethyl)ethyl] phenyl]carbamoyl]-2-cyano-phenyl]-4-cyano-2-methyl-benzamide;

2-(1,3-dioxan-2-yl)-6-[2-(3-pyridinyl)-5-thiazolyl]-pyridine; 2-[6-[2-(5-fluoro-3-pyridinyl)-5-thiazo-lyl]-2-pyridinyl]-pyrimidine; 2-[6-[2-(3-pyridinyl)-5-thiazolyl]-2-pyridinyl]-pyrimidine; N-methylsul-fonyl-6-[2-(3-pyridyl) thiazol-5-yl]pyridine-2-carboxamide; N-methylsulfonyl-6-[2-(3-pyridyl)thiazol-5-yl]pyridine-2-carboxamide; 1-[(6-chloro-3-pyridinyl)methyl]-1,2,3,5,6,7-hexahydro-5-methoxy-7-methyl-8-nitro-imidazo[1,2-a]pyridine; 1-[(6-chloropyridin-3-yl)methyl]-7-methyl-8-nitro-1,2,3,5,6,7-hexahydroimidazo[1,2-a]pyridin-5-ol; N-(1-methylethyl)-2-(3-pyridinyl)-2H-indazole-4-carboxamide; N-cyclopropyl-2-(3-pyridinyl)-2H-indazole-4-carboxamide; N-cyclohexyl-2-(3-pyridinyl)-2H-indazole-4-carboxamide; 2-(3-pyridinyl)-N-(2,2,2-trifluoroethyl)-2H-indazole-4-carboxamide; 2-(3-pyridinyl)-N-[(tetrahydro-2-furanyl) methyl]-2H-indazole-5-carboxamide; methyl 2-[2-(3-pyridinyl)-2H-indazol-5-yl]carbonyl]hydrazinecarboxylate; N-[(2,2-difluorocyclopropyl)methyl]-2-(3-pyridinyl)-2H-indazole-5-carboxamide; N-(2,2-difluoropropyl)-2-(3-pyridinyl)-2H-indazole-5-carboxamide; 2-(3-pyridinyl)-N-(2-pyrimidinylmethyl)-2H-indazole-5-carboxamide; N-[(5-methyl-2-pyrazinyl)methyl]-2-(3-pyridinyl)-2H-indazole-5-carboxamide, tyclopyrazoflor; sarolaner, lotilaner; N-[4-chloro-3-[[(phenylmethyl)amino]carbonyl]phenyl]-1-methyl-3-(1,1,2,2,2-pentafluoroethyl)-4-(trifluoromethyl)-1H-pyrazole-5-carboxamide; 2-(3-ethylsulfonyl-2-pyridyl)-3-methyl-6-(trifluoromethyDimidazo[4,5-b]pyridine, 2-[3-ethylsulfonyl-5-(trifluoromethyl)-2-pyridyl]-3-methyl-6-(trifluoromethyl)imidazo[4,5-b]pyridine; Isocycloseram; N-[4-chloro-3-(cyclopropylcarbamoyl)phenyl]-2-methyl-5-(1,1,2,2,2-pentafluoroethyl)-4-(trifluoromethyl)pyrazole-3-carboxamide, N-[4-chloro-3-[(1-cyanocyclopropyl)carbamoyl]phenyl]-2-methyl-5-(1,1,2,2,2-pentafluoroethyl)-4-(trifluoromethyppyrazole-3-carboxamide; acynonapyr; benzpyrimoxan; tigolaner; oxazosulfyl; [(2S,3R,4R,5S,6S)-3,5-dimethoxy-6-methyl-4-propoxy-tetrahydropyran-2-yl] N-[4-[1-[4-(trifluoromethoxy)phenyl]-1,2,4-triazol-3-yl] phenyl]carbamate; [(2S,3R,4R,5S,6S)-3,4,5-trimethoxy-6-methyl-tetrahydropyran-2-yl] N-[4-[1-[4-(trifluoromethoxy)phenyl]-1,2,4-triazol-3-yl]phenyl]carbamate; [(2S,3R,4R,5S,6S)-3,5-dimethoxy-6-methyl-4-propoxy-tetrahydropyran-2-yl] N-[4-[1-[4-(1,1,2,2,2-pentafluoroethoxy)phenyl]-1,2,4-triazol-3-yl]phenyl]carbamate; [(2S,3R,4R,5S,6S)-3,4,5-trimethoxy-6-methyl-tetrahydropyran-2-yl] N-[4-[1-[4-(1,1,2,2,2-pentafluoroethoxy)phenyl]-1,2,4-triazol-3-yl]phenyl]carbamate; (2Z)-3-(2-isopropylphenyl)-2-[(E)-[4-[1-[4-(trifluoromethoxy)phenyl]-1,2,4-triazol-3-yl]phenyl]methylenehydrazono]thiazolidin-4-one, (2Z)-3-(2-isopropylphenyl)-2-[(E)-[4-[1-[4-(1,1,2,2,2-pentafluoroethoxy)phenyl]-1,2,4-triazol-3-yl]phenyl] methylenehydrazono]thiazolidin-4-one; 2-(6-chloro-3-ethylsulfonyl-imidazo[1,2-a]pyridin-2-yl)-3-methyl-6-(trifluoromethyl)imidazo[4,5-b]pyridine, 2-(6-bromo-3-ethylsulfonyl-imidazo[1,2-a]pyridin-2-yl) methyl-6-(trifluoromethyl)imidazo[4,5-b]pyridine, 2-(3-ethylsulfonyl-6-iodo-imidazo[1,2-a]pyridin-2-yl)-3-methyl-6-(trifluoromethyl)imidazo[4,5-b]pyridine, 2-[3-ethylsulfonyl (trifluoromethyl)imidazo[1,2-a]pyridin-2-yl]-3-methyl-6-(trifluoromethyl)imidazo[4,5-b]pyridine, 2-(7-chloro-3-ethylsulfonyl-imidazo[1,2-a]pyridin-2-yl)-3-methyl-6-(trifluoromethyl)imidazo[4,5-b]pyridine, 2-(3-ethylsulfonyl-7-iodo-imidazo[1,2-a]pyridin-2-yl)-3-methyl (trifluoromethyl)imidazo[4,5-b]pyridine, 3-ethylsulfonyl-6-iodo-2-[3-methyl (trifluoromethyl)imidazo[4,5-b]pyridin-2-yl]imidazo[1,2-a]pyridine-8-carbonitrile, 2-[3-ethylsulfonyl-8-fluoro-6-(trifluoromethyl)imidazo[1,2-a]pyridin-2-yl]-3-methyl-6-(trifluoromethyl)imidazo[4,5-b]pyridine, 2-[3-ethylsulfonyl-7-(trifluoromethyl)imidazo[1,2-a]pyridin-2-yl]-3-methyl-6-(trifluoromethylsulfinyl)imidazo[4,5-b]pyridine, 2-[3-ethylsulfonyl-7-(trifluoromethyl)imidazo [1,2-a]pyridin-2-yl]-3-methyl-6-(trifluoromethyl)imidazo [4,5-c]pyridine, 2-(6-bromo-3-ethylsulfonyl-imidazo[1,2-a] pyridin-2-yl)-6-(trifluoromethyl)pyrazolo[4,3-c]pyridine.

The commercially available compounds of list M may be found in The Pesticide Manual, 18th Edition, C. MacBean, British Crop Protection Council (2018), or http://bcpcdata.com/pesticide-manual.html, http://www.alanwood.net/pesticides.

The active compounds described by IUPAC nomenclature are known from CN103814937; WO2013/003977, WO2007/101369, WO2018/177970, CN10171577, CN102126994, WO2007/101540, WO2007/043677, WO2011/085575, WO2008/134969, WO2012/034403, WO2006/089633, WO2008/067911, WO2006/043635, WO2009/124707, WO2013/050317, WO2010/060379, WO2010/127926, WO2010/006713, WO2012/000896, WO2007/101369, WO2012/143317, WO2015/038503, EP2910126, WO2015/059039, WO2015/190316, WO2012/126766, WO2009/102736, WO2013/116053, WO2018/052136.

The following list of fungicides, in conjunction with which the mixtures of the invention can be used, illustrates the possible combinations:

A) Respiration Inhibitors

- Inhibitors of complex III at $Q_o$ site: azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobin, metominostrobin, orysastrobin, picoxystrobin, pyraclostrobin, pyrametostrobin, pyraoxystrobin, trifloxystrobin, 2-(2-(3-(2,6-dichlorophenyl)-1-methyl-allylidene-aminooxymethyl)-phenyl)-2-methoxy-imino-N-methyl-acetamide, pyribencarb, triclopyricarb/chlorodincarb, famoxadone, fenamidone, methyl-N-[2-[(1,4-dimethyl-5-phenyl-pyrazol-3-yl)oxylm-ethyl]phenyl]-N-methoxy-carbamate, metyltetrapole, (Z,2E)-5-[1-(2,4- dichloro-phenyl)pyrazol-3-yl]-oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, pyriminostrobin, bifujunzhi, 2-(ortho-((2,5-dimethylphenyl-oxymethylen)phenyl)-3-methoxy-acrylic acid methylester;
- inhibitors of complex III at $Q_i$ site: cyazofamid, amisulbrom, [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate, fenpicoxamid, florylpicoxamid;
- inhibitors of complex II: benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad), pydiflumetofen, pyraziflumid, sedaxane, tecloftalam, thifluzamide, in-pyrfluxam, pyrapropoyne, fluindapyr, N-[2-[2-chloro-4-(trifluoromethyl)phenoxy]phenyl]-3-

(difluoromethyl)-5-fluoro-1-methyl-pyrazole-4-carboxamide, methyl (E)-2-[2-[(5-cyano-2-methyl-phenoxy)methyl]phenyl]-3-methoxy-prop-2-enoate, isoflucypram, 2-(difluoromethyl)-N-(1,1,3-trimethyl-indan-4-yl)pyridine-3-carboxamide, 2-(difluoromethyl)-N-[(3R)-1,1,3-trimethylindan-4-yl]pyridine-3-carboxamide, 2-(difluoromethyl)-N-(3-ethyl-1,1-dimethyl-indan-4-yl)pyridine-3-carboxamide, 2-(difluoromethyl)-N-[(3R)-3-ethyl-1,1-dimethyl-indan-4-yl]pyridine-3-carboxamide, 2-(difluoromethyl)-N-(1,1-dimethyl-3-propyl-indan-4-yl)pyridine-3-carboxamide, 2-(difluoromethyl)-N-[(3R)-1,1-dimethyl-3-propyl-indan-4-yl]pyridine-3-carboxamide, 2-(difluoromethyl)-N-(3-isobutyl-1,1-dimethyl-indan-4-yl)pyridine-3-carboxamide, 2-(difluoromethyl)-N-[(3R)-3-isobutyl-1,1-dimethyl-indan-4-yl]pyridine-3-carboxamide;

other respiration inhibitors: diflumetorim; nitrophenyl derivates: binapacryl, dinobuton, dinocap, fluazinam, meptyldinocap, ferimzone; organometal compounds: fentin salts, e.g. fentin-acetate, fentin chloride, fentin hydroxide; ametoctradin; silthiofam;

B) Sterol Biosynthesis Inhibitors (Sbi Fungicides)

C14 demethylase inhibitors: triazoles: azaconazole, bitertanol, bromuconazole, cypro-conazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 2-(2,4-difluorophenyl)-1,1-difluoro-3-(tetrazol-1-yl)-1-[5-[4-(2,2,2-trifluoroethoxy)phenyl]-2-pyridyl]propan-2-ol, 2-(2,4-difluorophenyl)-1,1-difluoro-3-(tetrazol-1-yl)-1-[5-[4-(trifluoromethoxy)phenyl]-2-pyridyl]propan-2-ol, 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile, ipfentrifluconazole, mefentrifluconazole, 2-(chloromethyl)-2-methyl-5-(p-tolylmethyl)-1-(1,2,4-triazol-1-ylmethyl)cyclopentanol; imidazoles: imazalil, pefurazoate, prochloraz, triflumizol; pyrimidines, pyridines, piperazines: fenarimol, pyrifenox, triforine, [3-(4-chloro-2-fluoro-phenyl)-5-(2,4-di-fluorophenyl)isoxazol-4-yl]-(3-pyridyl)methanol;

Delta14-reductase inhibitors: aldimorph, dodemorph, dodemorph-acetate, fenpropimorph, tridemorph, fenpropidin, piperalin, spiroxamine;

Inhibitors of 3-keto reductase: fenhexamid;

Other Sterol biosynthesis inhibitors: chlorphenomizole;

C) Nucleic Acid Synthesis Inhibitors phenylamides or acyl amino acid fungicides: benalaxyl, benalaxyl-M, kiralaxyl, metalaxyl, metalaxyl-M, ofurace, oxadixyl;

other nucleic acid synthesis inhibitors: hymexazole, octhilinone, oxolinic acid, bupirimate, 5-fluorocytosine, 5-fluoro-2-(p-tolylmethoxy)pyrimidin-4-amine, 5-fluoro-2-(4-fluorophenyl-methoxy)pyrimidin-4-amine, 5-fluoro-2-(4-chlorophenylmethoxy)pyrimidin-4 amine;

D) Inhibitors of Cell Division and Cytoskeleton tubulin inhibitors: benomyl, carbendazim, fuberidazole, thiabendazole, thiophanate-me-thyl, pyridachlometyl, N-ethyl-2-[(3-ethynyl-8-methyl-6-quinolyl)oxy]butanamide, N-ethyl-2-[(3-ethynyl-8-methyl-6-quinolyl)oxy]-2-methylsulfanyl-acetamide, 2-[(3-ethynyl-8-methyl-6-quinol-yl)oxy]-N-(2-fluoroethyl)butanamide, 2-[(3-ethynyl-8-methyl-6-quinolyl)oxy]-N-(2-fluoroethyl)-2-methoxy-acetamide, 2-[(3-ethynyl-8-methyl-6-quinolyl)oxy]-N-propyl-butanamide, 2-[(3-ethynyl-8-methyl-6-quinoly)oxy]-2-methoxy-N-propyl-acetamide, 2-[(3-ethynyl-8-methyl-6-quinolyl)oxy]-2-methylsulfanyl-N-propyl-acetamide, 2-[(3-ethynyl-8-methyl-6-quinolyl)oxy]-N-(2-fluoroethyl)-2-methylsulfanyl-acetamide, 4-(2-bromo-4-fluoro-phenyl)-N-(2-chloro-6-fluoro-phenyl)-2,5-dimethyl-pyrazol-3-amine;

other cell division inhibitors: diethofencarb, ethaboxam, pencycuron, fluopicolide, zoxamide, metrafenone, pyriofenone, phenamacril;

E) Inhibitors of amino acid and protein synthesis methionine synthesis inhibitors: cyprodinil, mepanipyrim, pyrimethanil;

protein synthesis inhibitors: blasticidin-S, kasugamycin, kasugamycin hydrochloride-hydrate, mildiomycin, streptomycin, oxytetracyclin;

F) Signal Transduction Inhibitors

MAP/histidine kinase inhibitors: fluoroimid, iprodione, procymidone, vinclozolin, fludioxonil;

G protein inhibitors: quinoxyfen;

G) Lipid and Membrane Synthesis Inhibitors

Phospholipid biosynthesis inhibitors: edifenphos, iprobenfos, pyrazophos, isoprothiolane;

lipid peroxidation: dicloran, quintozene, tecnazene, tolclofos-methyl, biphenyl, chloroneb, etridiazole, zinc thiazole;

phospholipid biosynthesis and cell wall deposition: dimethomorph, flumorph, mandipropamid, pyrimorph, benthiavalicarb, iprovalicarb, valifenalate;

compounds affecting cell membrane permeability and fatty acides: propamocarb;

inhibitors of oxysterol binding protein: oxathiapiprolin, fluoxapiprolin, 4-[1-[2-[3-(difluoro-methyl)-5-methyl-pyrazol-1-yl]acetyl]-4-piperidyl]-N-tetralin-1-yl-pyridine-2-carboxamide, 4-[1-[2-[3,5-bis(difluoromethyl)pyrazol-1-yl]acetyl]-4-piperidyl]-N-tetralin-1-yl-pyridine-2-carboxamide, 4-[1-[2-[3-(difluoromethyl)-5-(trifluoromethyl)ppyrazol-1-yl]acetyl]-4-piperidyl-]-N-tetralin-1-yl-pyridine-2-carboxamide, 4-[1-[2-[5-cyclopropyl-3-(difluoromethyppyrazol-1-yl]acetyl]-4-piperidyl]-N-tetralin-1-yl-pyridine-2-carboxamide, 4-[1-[2-[5-methyl-3-(trifluoromethyl)pyrazol-1-yl]acetyl]-4-piperidyl]-N-tetralin-1-yl-pyridine-2-carboxamide, 4-[1-[2-[5-(difluoromethyl)-3-(trifluoromethyl)pyrazol-1-yl]acetyl]-4-piperidyl]-N-tetralin-1-yl-pyridine-2-carboxamide, 4-[1-[2-[3,5-bis(trifluoromethyl)ppyrazol-1-yl]acetyl]-4-piperidyl]-N-tetralin-1-yl-pyridine-2-carboxamide, (4-[1-[2-[5-cyclopropyl-3-(trifluoromethyl)pyrazol-1-yl]acetyl]-4-piperidyl]-N-tetralin-1-yl-pyridine-2-carboxamide;

H) Inhibitors with Multi Site Action inorganic active substances: Bordeaux mixture, copper, copper acetate, copper hydroxide, copper oxychloride, basic copper sulfate, sulfur;

thio- and dithiocarbamates: ferbam, mancozeb, maneb, metam, metiram, propineb, thiram, zineb, ziram;

organochlorine compounds: anilazine, chlorothalonil, captafol, captan, folpet, dichlofluanid, dichlorophen, hexachlorobenzene, pentachlorphenole and its salts, phthalide, tolylfluanid;

guanidines and others: guanidine, dodine, dodine free base, guazatine, guazatine-acetate, iminoctadine, iminoctadine-triacetate, iminoctadine-tris(albesilate), dithianon, 2,6-di-methyl-1H,5H-[1,4]dithiino[2,3-c:5,6-c']dipyrrole-1,3,5,7(2H,6H)-tetraone;

I) Cell wall synthesis inhibitors
  inhibitors of glucan synthesis: validamycin, polyoxin B;
  melanin synthesis inhibitors: pyroquilon, tricyclazole, carpropamid, dicyclomet, fenoxanil;

J) Plant defence inducers
  acibenzolar-S-methyl, probenazole, isotianil, tiadinil, prohexadione-calcium; phospho-nates: fosetyl, fosetyl-aluminum, phosphorous acid and its salts, calcium phosphonate, potassium phosphonate, potassium or sodium bicarbonate, 4-cyclopropyl-N-(2,4-dimethoxy-phenyl)thiadiazole-5-carboxamide;

K) Unknown mode of action
  bronopol, chinomethionat, cyflufenamid, cymoxanil, dazomet, debacarb, diclocymet, diclomezine, difenzoquat, difenzoquat-methylsulfate, diphenylamin, fenitropan, fenpyrazamine, flumetover, flusulfamide, flutianil, harpin, methasulfocarb, nitrapyrin, nitrothal-isopropyl, tolprocarb, oxin-copper, proquinazid, tebufloquin, tecloftalam, triazoxide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-[4-[[3-[(4-chlorophenyl) methyl]-1,2,4-thiadiazol-5-yl]oxy]-2,5-dimethyl-phenyl]-N-ethyl-N-methyl-formamidine, N'-(5-bromo-6-indan-2-yloxy-2-methyl-3-pyridyl)-N-ethyl-N-methyl-formamidine, N'-[5-bromo-6-[1-(3,5-difluorophenyl)ethoxy]-2-methyl-3-pyridyl]-N-ethyl-N-methyl-formamidine, N'-[5-bromo-6-(4-isopropylcyclohexoxy)-2-methyl-3-pyridyl]-N-ethyl-N-methyl-formamidine, N'-[5-bromo-2-methyl-6-(1-phenylethoxy)-3-pyridyl]-N-ethyl-N-methyl-formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, 2-(4-chloro-phenyl)-N-[4-(3,4-dimethoxy-phenyl)-isoxazol-5-yl]-2-prop-2-ynyloxy-acetamide, 3-[5-(4-chloro-phenyl)-2,3-dimethyl-isoxazolidin-3-yl]-pyridine (pyrisoxazole) 3-[5-(4-methylphenyl)-2,3-dimethyl-isoxazolidin-3 yl]-pyridine, 5-chloro-1-(4,6-dimethoxy-pyrimidin-2-yl)-2-methyl-1H-benzoimidazole, ethyl (Z)-3-amino-2-cyano-3-phenyl-prop-2-enoate (K.1.40), picarbutrazox, pentyl N46-[[(Z)-[(1-methyltetrazol-5-yl)-phenyl-methylene]amino]oxymethyl]-2-pyridyl]carbamate, but-3-ynyl N-[6-[[(Z)-[(1-methyltetrazol-5-yl)-phenyl-methylene]amino]oxymethyl]-2-pyridyl]carbamate, ipflufenoquin, quinofumelin, benziothiazolinone, bromothalonil, 2-(6-benzyl-2-pyridyl)quinazoline, 2-[6-(3-fluoro-4-methoxy-phenyl)-5-methyl-2-pyridyl]quinazoline, dichlobentiazox, N'-(2,5-dimethyl-4-phenoxy-phenyl)-N-ethyl-N-methyl-formamidine, pyrifenamine, fluopimomide, N'-[5-bromo-2-methyl-6-(1-methyl-2-propoxy-ethoxy)-3-pyridyl]-N-ethyl-N-methyl-formamidine;

The fungicides described by common names, their preparation and their activity e.g. against harmful fungi is known (cf.: http://www.alanwood.net/pesticides/); these substances are commercially available.

The compounds listed above as potential further mixture partner, their preparation and their activity e.g. against harmful fungi is known (cf.: http://www.alanwood.net/pesticides/); these substances are commercially available. The compounds described by IUPAC nomenclature, their preparation and their pesticidal activity are also known (cf. Can. J. Plant Sci. 48(6), 587-94, 1968; EP 141 317; EP 152 031; EP 226 917; EP 243 970; EP 256 503; EP 428 941; EP 532 022; EP 1 028 125; EP 1 035 122; EP 1 201 648; EP 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 10/139271, WO 11/028657, WO 12/168188, WO 07/006670, WO 11/77514; WO 13/047749, WO 10/069882, WO 13/047441, WO 03/16303, WO 09/90181, WO 13/007767, WO 13/010862, WO 13/127704, WO 13/024009, WO 13/24010, WO 13/047441, WO 13/162072, WO 13/092224, WO 11/135833, CN 1907024, CN 1456054, CN 103387541, CN 1309897, WO 12/84812, CN 1907024, WO 09094442, WO 14/60177, WO 13/116251, WO 08/013622, WO 15/65922, WO 94/01546, EP 2865265, WO 07/129454, WO 12/165511, WO 11/081174, WO 13/47441). Some compounds are identified by their CAS Registry Number.

Biopesticides

Suitable mixing partners for the mixtures of the invention also include biopesticides. Biopesticides have been defined as a form of pesticides based on micro-organisms (bacteria, fungi, viruses, nematodes, etc.) or natural products (compounds, e.g. metabolites, proteins, or extracts from biological or other natural sources) (U.S. Environmental Protection Agency: http://www.epa.gov/pesticides/biopesticides/). Biopesticides fall into two major classes, microbial and biochemical pesticides:

(1) Microbial pesticides consist of bacteria, fungi or viruses (and often include the metabolites that bacteria and fungi produce). Entomopathogenic nematodes are also classified as microbial pesticides, even though they are multi-cellular.

(2) Biochemical pesticides are naturally occurring substances or or structurally-similar and functionally identical to a naturally-occurring substance and extracts from biological sources that control pests or provide other crop protection uses as defined below, but have non-toxic mode of actions (e.g. growth or developmental regulation, attractents, repellents or defence activators (e.g. induced resistance) and are relatively non-toxic to mammals. The following list of biopesticides, in conjunction with which the mixtures of the invention can be used, illustrates the possible combinations:

L) Biopesticides

L1) Microbial pesticides with fungicidal, bactericidal, viricidal and/or plant defense activator activity: *Ampelomyces quisqualis, Aspergillus flavus, Aureobasidium pullulans, Bacillus altitudinis, B. amyloliquefaciens, B. amyloliquefaciens* ssp. *plantarum* (*B. velezensis*), *B. megaterium, B. mojavensis, B. mycoides, B. pumilus, B. simplex, B. solisalsi, B. subtilis, B. subtilis* var. *amyloliquefaciens, B. velezensis, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea f. catenulate* (*Gliocladium catenulatum*), *Gliocladium roseum, Lysobacter antibioticus, L. enzymogenes, Metschnikowia fructicola, Microdochium dimerum, Microsphaeropsis ochracea,*

*Muscodor albus, Paenibacillus alvei, Paenibacillus epiphyticus, P. polymyxa, Pantoea vagans, Penicillium bilaiae, Phlebiopsis gigantea, Pseudomonas* sp., *Pseudomonas chlororaphis, Pseudo-zyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Ulocladium oudemansii, Verticillium dahlia*, zucchini yellow mosaic virus (avirulent strain);

L2) Biochemical pesticides with fungicidal, bactericidal, viricidal and/or plant defense activator activity: harpin protein, *Reynoutria sachalinensis* extract;

L3) Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. t.* ssp. *israelensis, B. t.* ssp. *galleriae, B. t.* ssp. *kurstaki, B. t.* ssp. *tenebrionis, Beauveria bassiana, B. brongniartii, Burkholderia* spp., *Chromobacterium subtsugae, Cydia pomonella* granulovirus (CpGV), *Ciyptophlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, M. anisopliae var. anisopliae, M. anisopliae var. acridum, Nomuraea rileyi, Paecilomyces fumosoroseus, P. lilacinus, Paenibacillus popilliae, Pasteuria* spp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus, S. microflavus;*

L4) Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, cis-jasmone, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, (R)-1-octen-3-ol, pentatermanone, (E,Z,Z)-3,8,11-tetradecatrienyl acetate, (Z,E)-9,12-tetradecadien-1-yl acetate, (Z)-7-tetradecen-2-one, (Z)-9-tetradecen-l-yl acetate, (Z)-11-tetradecenal, (Z)-11-tetradecen-1-ol, extract of *Chenopodium ambrosiodes*, Neem oil, Quillay extract;

L5) Microbial pesticides with plant stress reducing, plant growth regulator, plant growth promoting and/or yield enhancing activity: *Azospirillum amazonense, A. brasilense, A. lipoferum, A. irakense, A. halopraeferens, Bradyrhizobium* spp., *B. elkanii, B. japonicum, B. liaoningense, B. lupini, Delftia acidovorans, Glomus intraradices, Mesorhizobium* spp., *Rhizobium leguminosarum* bv. *phaseoli, R. I.* bv. *trifolii, R. I.* bv. *viciae, R. tropici, Sinorhizobium meliloti;*

The biopesticides from group L1) and/or L2) may also have insecticidal, acaricidal, molluscidal, pheromone, nematicidal, plant stress reducing, plant growth regulator, plant growth promoting and/or yield enhancing activity. The biopesticides from group L3) and/or L4) may also have fungicidal, bactericidal, viricidal, plant defense activator, plant stress reducing, plant growth regulator, plant growth promoting and/or yield enhancing activity. The biopesticides from group L5) may also have fungicidal, bactericidal, viricidal, plant defense activator, insecticidal, acaricidal, molluscidal, pheromone and/or nematicidal activity.

Many of these biopesticides have been deposited under deposition numbers mentioned herein (the prefices e.g. ATCC or DSM refer to the acronym of the respective culture collection, for details see e.g. here: http://www. wfcc.info/ccinfo/collection/by acronym/), are referred to in literature, registered and/or are commercially available: mixtures of *Aureobasidium pullulans* DSM 14940 and DSM 14941 isolated in 1989 in Konstanz, Germany (e.g. blastospores in BlossomProtect® from bio-ferm GmbH, Austria), *Azospirillum brasilense* Sp245 originally isolated in wheat reagion of South Brazil (Passo Fundo) at least prior to 1980 (BR 11005; e.g. GELFIX® Gramíneas from BASF Agricultural Specialties Ltd., Brazil), *A. brasilense strains* Ab-V5 and Ab-V6 (e.g. in AzoMax from Novozymes BioAg Produtos papra Agricultura Ltda., Quattro Barras, Brazil or Simbiose-Maíz® from Simbiose-Agro, Brazil; Plant Soil 331, 413-425, 2010), *Bacillus amyloliquefaciens* strain AP-188 (NRRL B-50615 and B-50331; U.S. Pat. No. 8,445,255); *B. amyloliquefaciens* ssp. *plantarum* strains formerly also sometimes referred to as *B. subtilis*, recently together with *B. methylotrophicus*, and *B. velezensis* classified as *B. velezensis* (Int. J. Syst. Evol. Microbiol. 66, 1212-1217, 2016): *B. a.* ssp. *plantarum* or *B. velezensis* D747 isolated from air in Kikugawa-shi, Japan (US 20130236522 A1; FERM BP-8234; e.g. Double Nickel™ 55 WDG from Certis LLC, USA), *B. a.* ssp. *plantarum* or *B. velezensis* FZB24 isolated from soil in Brandenburg, Germany (also called SB3615; DSM 96-2; J. Plant Dis. Prot. 105, 181-197, 1998; e.g. Taegro® from Novozyme Biologicals, Inc., USA), *B. a.* ssp. *plantarum* or *B. velezensis* FZB42 isolated from soil in Brandenburg, Germany (DSM 23117; J. Plant Dis. Prot.

105, 181-197, 1998; e.g. RhizoVital® 42 from AbiTEP GmbH, Germany), *B. a.* ssp. *plantarum* or *B. velezensis* MB1600 isolated from faba bean in Sutton Bonington, Nottinghamshire, U.K. at least before 1988 (also called 1430; NRRL B-50595; US 2012/0149571 Al; e.g. Integral® from BASF Corp., USA), *B. a.* ssp. *plantarum* or *B. velezensis* QST-713 isolated from peach orchard in 1995 in California, U.S.A. (NRRL B-21661; e.g. Serenade® MAX from Bayer Crop Science LP, USA), *B. a.* ssp. *plantarum* or *B. velezensis* TJ1000 isolated in 1992 in South Dakoda, U.S.A. (also called 1BE; ATCC BAA-390; CA 2471555 A1; e.g. QuickRoots™ from TJ Technologies, Watertown, S. Dak., USA); *B. firmus* CNCM 1-1582, a variant of parental strain EIP-N1 (CNCM 1-1556) isolated from soil of central plain area of Israel (WO 2009/126473, U.S. Pat. No. 6,406,690; e.g. Votivo® from Bayer CropScience LP, USA), *B. pumilus* GHA 180 isolated from apple tree rhizosphere in Mexico (IDAC 260707-01; e.g. PRO-MIX® BX from Premier Horticulture, Quebec, Canada), *B. pumilus* INR-7 otherwise referred to as BU-F22 and BU-F33 isolated at least before 1993 from cucumber infested by *Erwinia tracheiphila* (NRRL B-50185, NRRL B-50153; U.S. Pat. No. 8,445,255), *B. pumilus* KFP9F isolated from the rhizosphere of grasses in South Africa at least before 2008 (NRRL B-50754; WO 2014/029697; e.g. BAC-UP or FUSION-P from BASF Agricultural Specialities (Pty) Ltd., South Africa), *B. pumilus* QST 2808 was isolated from soil collected in Pohnpei, Federated States of Micronesia, in 1998 (NRRL B-30087; e.g. Sonata® or Ballad® Plus from Bayer Crop Science LP, USA), *B. simplex* ABU 288 (NRRL B-50304; U.S. Pat. No. 8,445,255), *B. subtilis* FB17 also called UD 1022 or UD10-22 isolated from red beet roots in North America (ATCC PTA-11857; System. Appl. Microbiol. 27, 372-379, 2004;

US2010/0260735; WO 2011/109395); *B. thuringiensis* ssp. *aizawai* ABTS-1857 isolated from soil taken from a lawn in Ephraim, Wisconsin, U.S.A., in 1987 (also called ABG-6346; ATCC SD-1372; e.g. XenTari® from BioFa AG, Münsingen, Germany), *B. t.* ssp. kurstaki ABTS-351 identical to HD-1 isolated in 1967 from diseased Pink Bollworm black larvae in Brownsville, Tex., U.S.A. (ATCC SD-1275; e.g. Dipel® DF from Valent BioSciences, IL, USA), *B. t.* ssp. *kurstaki* SB4 isolated from *E. saccharina* larval cadavers (NRRL B-50753; e.g. Beta Pro® from BASF Agricultural Specialities (Pty) Ltd., South Africa), *B. t.* ssp. *tenebrionis* NB-176-1, a mutant of strain NB-125, a wild type strain isolated in 1982 from a dead pupa of the beetle Tenebrio molitor (DSM 5480; EP 585 215 B1; e.g. Novodor® from Valent BioSciences, Switzerland), *Beauveria bassiana* GHA (ATCC 74250; e.g. BotaniGard® 22WGP from Laverlam Int. Corp., USA), *B. bassiana* JW-1 (ATCC 74040; e.g. Naturalis® from CBC (Europe) S.r.I., Italy), *B. bassiana* PPRI 5339 isolated from the larva of the tortoise beetle *Conchyloctenia punctata* (NRRL 50757; e.g. BroadBand® from BASF Agricultural Specialities (Pty) Ltd., South Africa), *Bradyrhizobium elkanii* strains SEMIA 5019 (also called 29W) isolated in Rio de Janeiro, Brazil and SEMIA 587 isolated in 1967 in the State of Rio Grande do Sul, from an area previously inoculated with a North American isolate, and used in commercial inoculants since 1968 (Appl. Environ. Microbiol. 73(8), 2635, 2007; e.g. GELFIX 5 from BASF Agricultural Specialties Ltd., Brazil), *B. japonicum* 532c isolated from Wisconsin field in U.S.A. (Nitragin 61A152; Can. J. Plant. Sci. 70, 661-666, 1990; e.g. in Rhizoflo®, Histick®, Hicoat® Super from BASF Agricultural Specialties Ltd., Canada), *B. japonicum* E-109 variant of strain USDA 138 (INTA E109, SEMIA 5085; Eur. J. Soil Biol. 45, 28-35, 2009; Biol. Fertil. Soils 47, 81-89, 2011); *B. japonicum* strains deposited at SEMIA known from Appl. Environ. Microbiol. 73(8), 2635, 2007: SEMIA 5079 isolated from soil in Cerrados region, Brazil by Embrapa-Cerrados used in commercial inoculants since 1992 (CPAC 15; e.g. GELFIX 5 or ADHERE 60 from BASF Agricultural Specialties Ltd., Brazil), *B. japonicum* SEMIA 5080 obtained under lab condtions by Embrapa-Cerrados in Brazil and used in commercial inoculants since 1992, being a natural variant of SEMIA 586 (CB1809) originally isolated in U.S.A. (CPAC 7; e.g. GELFIX 5 or ADHERE 60 from BASF Agricultural Specialties Ltd., Brazil); *Burkholderia* sp. A396 isolated from soil in Nikko, Japan, in 2008 (NRRL B-50319; WO 2013/032693; Marrone Bio Innovations, Inc., USA), *Coniothyrium minitans* CON/M/91-08 isolated from oilseed rape (WO 1996/021358; DSM 9660; e.g. Contans® WG, Intercept® WG from Bayer CropScience AG, Germany), harpin (alpha-beta) protein (Science 257, 85-88, 1992; e.g. Messenger™ or HARP-N-Tek from Plant Health Care plc, U.K.), *Helicoverpa armigera* nucleopolyhedrovirus (HearNPV) (J. Invertebrate Pathol. 107, 112-126, 2011; e.g. Helicovex® from Adermatt Biocontrol, Switzerland; Diplomata® from Koppert, Brazil; Vivus® Max from AgBiTech Pty Ltd., Queensland, Australia), *Helicoverpa zea* single capsid nucleopolyhedrovirus (HzSNPV) (e.g. Gemstar® from Certis LLC, USA), *Helicoverpa zea* nucleopolyhedrovirus ABA-NPV-U (e.g. Heligen® from AgBiTech Pty Ltd., Queensland, Australia), *Heterorhabditis bacteriophora* (e.g. Nemasys® G from BASF Agricultural Specialities Limited, UK), *Isaria fumosorosea* Apopka-97 isolated from mealy bug on gynura in Apopka, Fla., U.S.A. (ATCC 20874; Biocontrol Science Technol. 22(7), 747-761, 2012; e.g. PFR-97TM or PreFeRal® from Certis LLC, USA), *Metarhizium anisopliae* var. anisopliae F52 also called 275 or V275 isolated from codling moth in Austria (DSM 3884, ATCC 90448; e.g. Met52® Novozymes Biologicals BioAg Group, Canada), *Metschnikowia fructicola* 277 isolated from grapes in the central part of Israel (US 6,994,849; NRRL Y-30752; e.g. formerly Shemer® from Agrogreen, Israel), *Paecilomyces ilacinus* 251 isolated from infected nematode eggs in the Philippines (AGAL 89/030550; W01991/02051; Crop Protection 27, 352-361, 2008; e.g. BioAct®from Bayer CropScience AG, Germany and MeloCon® from Certis, USA), *Paenibacillus alvei* NAS6G6 isolated from the rhizosphere of grasses in South Africa at least before 2008 (WO 2014/029697; NRRL B-50755; e.g. BAC-UP from BASF Agricultural Specialities (Pty) Ltd., South Africa), *Paenibacillus* strains isolated from soil samples from a variety of European locations including Germany: *P. epiphyticus* Lu17015 (WO 2016/020371; DSM 26971), *P. polymyxa* ssp. *plantarum* Lu16774 (WO 2016/020371; DSM 26969), *P. p.* ssp. *plantarum* strain Lu17007 (WO 2016/020371; DSM 26970); *Pasteuria nishizawae* Pn1 isolated from a soybean field in the mid-2000s in Illinois, U.S.A. (ATCC SD-5833; Federal Register 76(22), 5808, Feb. 2, 2011; e.g. Clariva™ PN from Syngenta Crop Protection, LLC, USA), *Penicillium bilaiae* (also called *P. bilaii*) strains ATCC 18309 (=ATCC 74319), ATCC 20851 and/or ATCC 22348 (=ATCC 74318) originally isolated from soil in Alberta, Canada (Fertilizer Res. 39, 97-103, 1994; Can. J. Plant Sci. 78(1), 91-102, 1998; U.S. Pat. No. 5,026,417, WO 1995/017806; e.g. Jump Start®, Provide® from Novozymes Biologicals BioAg Group, Canada), *Reynoutria sachalinensis* extract (EP 0307510 B1; e.g. Regalia® SC from Marrone Biolnnovations, Davis, Calif., USA or Milsana® from BioFa AG, Germany), *Steinernema carpocapsae* (e.g. Millenium® from BASF Agricultural Specialities Limited, UK), *S. feltiae* (e.g. Nemashield® from BioWorks, Inc., USA; Nemasys® from BASF Agricultural Specialities Limited, UK), *Streptomyces microflavus* NRRL B-50550 (WO 2014/124369; Bayer CropScience, Germany), *Trichoderma asperelloides* JM41R isolated in South Africa (NRRL 50759; also referred to as *T. fertile*; e.g. Trichoplus® from BASF Agricultural Specialities (Pty) Ltd., South Africa), *T. harzianum* T-22 also called KRL-AG2 (ATCC 20847; BioControl 57, 687-696, 2012; e.g. Plantshield® from BioWorks Inc., USA or SabrEx™ from Advanced Biological Marketing Inc., Van Wert, Ohio, USA).

According to the invention, the solid material (dry matter) of the biopesticides (with the exception of oils e.g. Neem oil) are considered as active components (e.g. to be obtained after drying or evaporation of the extraction or suspension medium in case of liquid formulations of the microbial pesticides).

In accordance with the invention, the weight ratios and percentages used herein for a biological extract e.g. Quillay extract are based on the total weight of the dry content (solid material) of the respective extract(s).

The total weight ratios of compositions comprising at least one microbial pesticide in the form of viable microbial cells including dormant forms, can be determined using the amount of CFU of the respective microorganism to calculate the total weight of the respective active component with the following equation that $1\times10^{10}$ CFU equals one gram of total weight of the respective active component. Colony forming unit is measure of viable microbial cells, in particular fungal and bacterial cells. In addition, here "CFU" may also be understood as the number of (juvenile) individual nematodes in case of (entomopathogenic) nematode biopesticides, e.g. *Steinernema feltiae*.

When mixtures comprising microbial pesticides are employed in crop protection, the application rates range from $1\times10^6$ to $5\times10^{16}$ (or more) CFU/ha, preferably from $1\times10^5$ to $1\times10^{13}$ CFU/ha, and even more preferably from $1\times10^9$ to $5\times10^{15}$ CFU/ha and in particular from $1\times10^{12}$ to $5\times10^{14}$ CFU/ha. In the case of nematodes as microbial pesticides (e.g. *Steinernema feltiae*), the application rates regularly range from $1\times10^5$ to $1\times10^{12}$ (or more), preferably from $1\times10^8$ to $1\times10^{11}$, more preferably from $5\times10^8$ to $1\times10^{10}$ individuals (e.g. in the form of eggs, juvenile or any other live stages, preferably in an infetive juvenile stage) per ha.

When mixtures comprising microbial pesticides are employed in seed treatment, the application rates generally range from $1\times10^6$ to $1\times10^{12}$ (or more) CFU/seed, preferably from $1\times10^6$ to $1\times10^9$ CFU/seed. Furthermore, the application rates with respect to seed treatment generally range from $1\times10^7$ to $1\times10^{14}$ (or more) CFU per 100 kg of seed, preferably from $1\times10^9$ to $1\times10^{12}$ CFU per 100 kg of seed.

Biological Tests

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, *Weeds*, 15, 20-22):

$$E = X + Y - \frac{XY}{100}$$

When the observed combined control effect is greater than the expected combined control effect (E), then the combined effect is synergistic.

The following tests demonstrate the control efficacy of mixtures or compositions of this invention on specific pests. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests.

The analysis of synergism or antagonism between the mixtures or compositions can be determined using Colby's equation.

Biological Examples

EXAMPLE 1: ACTIVITY AGAINST SOUTHERN CHINCH BUG (*BLISSUS INSULARIS*, BLISIN)

Treatments were applied in a field with a natural infestation of Southern Chinch Bugs. The experiment was conducted with four replications, utilizing 3×3 m2 plots. The application was made in 813 liters per hectare spray volume.

The treatments consisted of an untreated check, and formulations containing either alpha-cypermethrin at a use rate of 95 grams ai/hectare, dinotefuran at 600 gram ai/hectare or a combination of alpha-cypermethrin and dinotefuran at 95+380 grams ai/hectare. Direct visual counts were made of larval chinch bugs in all stages of development after being mechanically vacuumed for 20 seconds from the surface of the turf. Chinch Bug abundance was measured using a commercially available lawn vacuum/blower combination machine by covering the vacuum (intake) orifice with mesh cloth and placing the intake on randomly within the turf plot and holding suction for one second. Samples were collected from each plot in an identical manner. After the sample was collected and the vacuum turned off, the captured contents of the mesh cloth were tapped into a 5-gallon plastic bucket for ease of counting of nymphs (at any instar).

The following average numbers of chinch bug nymphs were collected per sample per treatment 28 days after the insecticide applications were made.

TABLE 1

Average number of Chinch bug nymphs per treatment per sample

| Treatment | Gram ai/hectare | Nymph Counts | % Control | expected |
|---|---|---|---|---|
| Untreated check | | 31.3 | | |
| Alpha-cypermethrin | 95 | 6.0 | 81 | 96 |
| Dinotefuran | 600 | 5.8 | 81 | |
| Alpha-cypermethrin + Dinotefuran | 95 + 380 | 0.5 | 98 | |

EXAMPLE 2: ACTIVITY AGAINST SOD WEBWORM (*HERPETOGRAMMA PHAEOPTERALIS*, PACYPH)

Treatments were applied with a natural infestation of sod webworm. The experiment was conducted in four replications, utilizing 3×3 m2 plots. One application was made in 813 liters per hectare spray volume. po The treatments consisted of an untreated check, formulations of either alpha-cypermethrin at a use rate of 47.5 grams ai/hectare, dinotefuran at 600 gram ai/hectare or a combination of alpha-cypermethrin and dinotefuran at 47.5+190 grams ai/hectare.

Direct visual counts were made of sod webworm larvae in each plot 7 days after treatment.

TABLE 2

Average number of sod webworm larvae per treatment per sample

| Treatment | Gram ai/hectare | Sod Webworm Counts | % Control | expected |
|---|---|---|---|---|
| Untreated check | | 5.8 | | |
| Alpha-cypermethrin | 47.5 | 2.5 | 57 | 87 |
| Dinotefuran | 600 | 2.3 | 60 | |
| Alpha-cypermethrin + Dinotefuran | 47.5 + 190 | 0 | 100 | |

EXAMPLE 3: ACTIVITY AGAINST JAPANESE BEETLE GRUB (*POPILLIA JAPONICA*, POPIJA)

The trial was conducted in plots consisting of a mix of Poa pratensis (~10%)—Lolium perenne (~60%)—Festuca arundinacea (~10%), and Agrostis stolonifera (<10%). Treatments were arranged in a randomized complete block design and replicated four times. Each replicate consisted of 3 arenas (~150 $in^2$). Each replicate was contained within a turfgrass plot measuring 9 $ft^2$. Treatments were applied in 813 liter/hectare spray volume.

To obtain consistent densities of white grub larvae, Japanese beetles (*Popillia japonica*) were captured in pheromone traps and seeded into the arenas to mate and oviposit.

20 males and 20 females were placed into 8 inch diameter PVC arenas (height=6 inch). The arena was driven 1 inch into the ground and fit with a mesh covering (324 openings/in2) to prevent beetles from escaping. After 3 days, the mesh coverings were removed, beetles removed, and 40 new beetles (20 males and 20 females) were placed into the arenas, followed by a third introduction. Nineteen days after the initial infestation date, the arenas were dismantled, and the turf was maintained as normal. Turf paint was used to mark the edges of turf where the arenas were located and reapplied as necessary.

White grub suppression was assessed 85 DAT by comparing the densities of grubs in treated and untreated plots. Three soil cores (total area=150 in2) were removed from each plot where the arenas were located using a large golf course cup cutter. Core soils were examined visually, by breaking the soil over a tray and looking for grubs (while in the field). The number of white grubs was pooled for the arenas in each replicate. Japanese beetle larvae present at time of evaluation (98.4%) were a mix of 2nd (42%) and 3rd (58%) instars.

TABLE 3

Average number of Japanese Beetle grubs per treatment per sample

| Treatment | Gram ai/hectare | Japanese Beetle Grub Counts | % Control | expected |
|---|---|---|---|---|
| Untreated check | | 1.75 | | |
| Alpha-cypermethrin | 95 | 2.25 | 0 | 0 |
| Dinotefuran | 600 | 2.00 | 0 | |
| Alpha-cypermethrin + Dinotefuran | 95 + 380 | 0.50 | 71 | |

EXAMPLE 4: ACTIVITY AGAINST MASKED CHAFER (*CYCLOCEPHALA* SPP., CYCCSP)

The trial was conducted with Kentucky Bluegrass as main turf variety, with a natural infestation of masked chafer grubs. Treatments were arranged in a randomized complete block design and replicated four times in plots measuring 24 $ft^2$.

Treatments were applied in 813 liter/hectare spray volume.

White grub control was determined by larvae counts 62 days after treatment. A sod cutter cut a strip down the center of each replicate and a shovel cut the stirp into a small square in the middle of each plot. The number of larvae in each 1 sq. ft. were counted.

TABLE 4

Average number of Masked Chafer grubs per treatment per sample

| Treatment | Gram ai/hectare | Masked Chafer Grub Counts | % Control | expected |
|---|---|---|---|---|
| Untreated check | | 2.75 | | |
| Alpha-cypermethrin | 95 | 0.25 | 91 | 97 |
| Dinotefuran | 600 | 1.00 | 64 | |
| Alpha-cypermethrin + Dinotefuran | 95 + 380 | 0.00 | 100 | |

EXAMPLE 5: ACTIVITY AGAINST BLACK CUT WORM (*AGROSTIS YPSILON*., AGROYP)

The study was conducted on a creeping bentgrass/annual bluegrass putting green in a golf course. The study was a field bioassay where insect larvae were placed in cages at different intervals after applying insecticide treatments.

Applications were made to 4-foot by 6-foot plots replicated four times in 813 liter spray volume per hectare. Black cutworm (*Agrostis ypsilon*) larvae were caged in the turf at after the treatments were applied. Cages consisted of six-inch diameter metal cans. Two cages were inserted into each plot and five second-instar larvae were placed into each cage (total of 10 larvae/plot) before dusk. Window screen and a plastic louver were placed on top of the cages and held down with nails to secure the larvae. Larvae were caged for four days (96 hours) then a disclosing solution of 1 fl. oz. Joy Ultra dish soap in 1 gallon of water was used to flush surviving larvae 19 days after treatment.

TABLE 5

Average number of black cutworms per treatment per sample

| Treatment | Gram ai/hectare | Black Cutworm Counts | % Control | expected |
|---|---|---|---|---|
| Untreated check | | 8.75 | | |
| Alpha-cypermethrin | 47.5 | 1.75 | 80 | 83 |
| Dinotefuran | 600 | 7.25 | 17 | |
| Alpha-cypermethrin + Dinotefuran | 47.5 + 190 | 0.00 | 100 | |

EXAMPLE 6: ACTIVITY AGAINST FALL ARMYWORM, (*SPODOPTERA FRUGIPERDA*, LAPHFR)

This trial was conducted at a golf course in an area planted with Hybrid bermudagrass, cv. '419', with natural infestation of fall armyworm. The trial was laid out in 6 replications with each plot measuring 20×25 ft. Applications were made in a spray volume of 203 liters per hectare. The fall armyworms were about second or third instar when found. Fall armyworm density assessment was conducted as soapy water flush. About one gallon of soapy water was poured into an area marked with a 1-sq-ft PVC pipe square. Fall armyworms surfaced within 5 minutes and were counted in each 1-sq-ft area. Fall armyworm densities in a total of three squares (or 3 subsamples) were determined in each plot at each sampling data. Assessments were conducted at 28 days after treatment.

TABLE 6

Average number of fall armyworm per treatment per sample

| Treatment | Gram ai/hectare | Fall Armyworm worm Counts | % Control | expected |
|---|---|---|---|---|
| Untreated check | | 3.22 | | |
| Alpha-cypermethrin | 95 | 1.39 | 57 | 58 |
| Dinotefuran | 600 | 3.17 | 2 | |
| Alpha-cypermethrin + Dinotefuran | 95 + 380 | 0.61 | 81 | |

EXAMPLE 7: ACTIVITY AGAINST FALL ARMYWORM, *SPODOPTERA FRUGIPERDA* (LAPHFR), FEEDING DAMAGE

A trial was established on a mature 'L-93' creeping bentgrass fairway. An initial application was made with a repeat application 8 days later. Fall armyworms were artificially infested at the test site eight hours after the second application. Ten living caterpillars were added to each plot and were protected within a PVC ring. Plots were rated five days after treatement for percent damage by caterpillar feeding within the ring area.

TABLE 7

Average feeding damage by fall armyworm per treatment per sample

| Treatment | Gram ai/hectare | Fall Armyworm damage (%) | % Reduction | expected |
|---|---|---|---|---|
| Untreated check | | 20.00 | | |
| Alpha-cypermethrin | 95 | 1.25 | 94 | 98 |
| Dinotefuran | 600 | 5.00 | 75 | |
| Alpha-cypermethrin + Dinotefuran | 95 + 380 | 0.00 | 100 | |

TABLE 8

Average number of masked chafer grubs per treatment per sample

| Treatment | Gram ai/hectare | Masked Chafer grub counts | % Control | expected |
|---|---|---|---|---|
| Untreated check | | 22.5 | | |
| Alpha-cypermethrin | 95 | 18.5 | 18 | 29 |
| Dinotefuran | 600 | 19.5 | 13 | |
| Alpha-cypermethrin + Dinotefuran | 95 + 380 | 13.25 | 41 | |

The test results in Table S show that, by virtue of strong synergism, the activity of the mixtures according to the invention is considerably higher than had been predicted using Colby's formula, even more, as for the prediction the higher concentration of the solo dinotefuran application was used. In the mixture application, the amount of dinotefuran was even lower.

TABLE S

| Example/ Target organism | DAT[1] | Solo application: Alpha-cypermethrin use rate g ai/ha | Solo application: Alpha-cypermethrin % activity | Solo application: Dinotefuran use rate g ai/ha | Solo application: Dinotefuran % activity | Combination alpha-cypermethrin + dinotefuran: alpha-cypermethrin + dinotefuran use rate g ai/ha | Combination: alpha-cypermethrin + dinotefuran % activity | Combination: expected[2] % activity | Combination: Synergism Y = Yes N = No | delta |
|---|---|---|---|---|---|---|---|---|---|---|
| 1: *Blissus insularis* | 28 | 95 | 81 | 600 | 81 | 95 + 380 | 98 | 96 | Y | 2 |
| 2: *Herpetogramma phaeopteralis* | 7 | 47.5 | 57 | 600 | 60 | 47.5 + 190 | 100 | 83 | Y | 17 |
| 3: *Popillia japonica* | 85 | 95 | 0 | 600 | 0 | 95 + 380 | 71 | 0 | Y | 71 |
| 4: *Cyclocephala* sp. | 62 | 95 | 91 | 600 | 64 | 95 + 380 | 100 | 97 | Y | 3 |
| 5: *Agrotis ipsilon* | 19 | 47.5 | 80 | 600 | 17 | 47.5 + 190 | 100 | 83 | Y | 17 |
| 6: *Spodoptera frugiperda* | 28 | 95 | 57 | 600 | 2 | 95 + 380 | 81 | 58 | Y | 23 |
| 7: *Spodoptera frugiperda* | 5 | 95 | 94 | 600 | 75 | 95 + 380 | 100 | 98 | Y | 2 |
| 8: *Cyclocephala* sp. | 4 | 95 | 18 | 600 | 13 | 95 + 380 | 41 | 29 | Y | 12 |

[1]DAT = Days after treatment

[2]for the value "expected", the activity of the solo application rate was used, although the amount of dinotefuran used in the combination application was lower.

EXAMPLE 8: ACTIVITY AGAINST MASKED CHAFER GRUB, *CYCLOCEPHALA* SPP. (CYCCSP)

The study was conducted on perennial ryegrass. Individual plots were 6 ft×6 ft and arranged in a randomized complete block design with 4 replications. Adult *Cyclocephala* spp. (masked chafer) were collected when active and immediately placed inside covered PVC rings on each plot. Approximately 50 adult masked chafers were added to each plot throughout the active adult stage. The rings were removed 24-36 hours after insecticide application. After the treatment, the plots were irrigated immediately with approximately 0.125" of water. Treatments were applied in water equivalent to 813 liters/hectare. The number of live grub larvae was assessed 4 days after treatment by removing a two-foot strip of sod cut to a depth of across each plot (12 ft2 per plot).

The invention claimed is:

1. A method for combating or controlling invertebrate pests in turf, which comprises applying a synergistically effective amount of a mixture of actives comprising alpha-cypermethrin and dinotefuran in a weight ratio of from 1:1 to 1:5 to the turf area, the invertebrate pests, their food supply, habitat, or breeding grounds.

2. The method according to claim 1, wherein the invertebrate pest in turf is selected from ants, Armyworm, Cutworm, Sod webworm, Billbug, Chinch bug, Annual bluegrass weevil, European cranefly, Mole cricket, and white grubs.

3. The method according to claim 2, wherein the invertebrate pest in turf is selected from white grubs, wherein the white grubs are larvae of the species selected from Asiatic garden beetle (*Maladera castanea*), Black turfgrass ataenius (*Ataenius spretulus*), European chafer (*Amphimallus*

*majale*), Green June beetle (*Cotinis nitida*), Japanese beetle (*Popillia japonica*), May/June beetle (*Phyllophaga spp.*), Northern masked chafer (*Cyclocephala borealis*), Oriental beetle (*Anomala orientalis*), and Southern masked chafer (*Cyclocephala lurida*).

4. The method according to claim 1, wherein the mixture of alpha-cypermethrin and dinotefuran is present in a weight ratio of 1:1 to 1:4.

5. The method according to claim 1, wherein the mixture of alpha-cypermethrin and dinotefuran is provided as a concentrated composition selected from suspension concentrate (SC), emulsion concentrate (EC), and wettable granule (WG).

6. The method according to claim 1, wherein the mixture of alpha-cypermethrin and dinotefuran is provided as a wettable granule which comprises between 0.01 and 95% by weight of active substances.

7. The method according to claim 1, wherein the mixture of alpha-cypermethrin and dinotefuran is applied as an aqueous spray solution.

8. The method according to claim 1, wherein 1 to 10 g of mixture of alpha-cypermethrin and dinotefuran are applied per 1000 square feet.

9. The method according to claim 7, wherein the spray solution comprising the mixture of alpha-cypermethrin and dinotefuran is at least one gallon of water per 1000 square feet.

10. The method according to claim 1, wherein the application is repeated at intervals of 3 to 31 days.

11. The method according to claim 1, wherein the turf is present in golf courses, athletic fields, cemeteries, sod farms, or gardens.

12. The method according to claim 1, wherein the invertebrate pests are pyrethroid-resistant.

13. The method according to claim 1, wherein the turf is predominantly one of the following turf grass plants or mixtures thereof: Bentgrass, Bluegrass, Ryegrass, Fine Fescues, Hybrid Bermudagrass, Kikuyugrass, St. Augustinegrass, Zoysiagrass, or Dichondra.

14. The method according to claim 2 wherein the invertebrate pest in turf is selected from fire ants, Fall Armyworm, Black Cutworm, and Southern mole cricket.

15. The method according to claim 13 wherein the turf is colonial bentgrass, creeping bentgrass, Kentucky Bluegrass, or Tall Fescue.

* * * * *